United States Patent
Mammou

(10) Patent No.: US 11,915,373 B1
(45) Date of Patent: Feb. 27, 2024

(54) ATTRIBUTE VALUE COMPRESSION FOR A THREE-DIMENSIONAL MESH USING GEOMETRY INFORMATION TO GUIDE PREDICTION

(71) Applicant: Apple Inc., Cupertino, CA (US)

(72) Inventor: Khaled Mammou, Vancouver (CA)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 17/663,794

(22) Filed: May 17, 2022

Related U.S. Application Data

(60) Provisional application No. 63/197,287, filed on Jun. 4, 2021.

(51) Int. Cl.
G06T 17/20 (2006.01)
G06T 15/04 (2011.01)

(52) U.S. Cl.
CPC .............. G06T 17/20 (2013.01); G06T 15/04 (2013.01)

(58) Field of Classification Search
None
See application file for complete search history.

(56) References Cited

U.S. PATENT DOCUMENTS

| | | | | |
|---|---|---|---|---|
| 8,462,149 | B2 * | 6/2013 | Lee | G06T 9/001 345/419 |
| 10,535,162 | B2 | 1/2020 | Laroche et al. | |
| 2019/0080483 | A1 * | 3/2019 | Mammou | G06T 7/50 |
| 2019/0311501 | A1 * | 10/2019 | Mammou | G06T 9/001 |
| 2020/0286261 | A1 | 9/2020 | Faramarzi et al. | |
| 2022/0020211 | A1 * | 1/2022 | Vytyaz | G06T 17/20 |

OTHER PUBLICATIONS

Isenburg, Martin, and Jack Snoeyink. "Compressing texture coordinates with selective linear predictions." Proceedings Computer Graphics International 2003. IEEE, 2003.*

* cited by examiner

*Primary Examiner* — Sultana M Zalalee
(74) *Attorney, Agent, or Firm* — Alexander A. Knapp; Kowert, Hood, Munyon, Rankin & Goetzel, P.C.

(57) ABSTRACT

A system comprises a prediction module configured to predict an attribute value, such as a texture coordinate, for a vertex of a triangle in a two-dimensional (2D) attribute representation based on known positions of vertices of a corresponding triangle in a three-dimensional (3D) geometric representation. In some embodiments, the prediction module adaptively selects a prediction technique between multiple available prediction techniques based on availability of vertices information in the 3D geometric representation and in the 2D attribute representation and further based on compression efficiency and distortion minimization. The prediction module enables compression of attribute information being signaled for volumetric visual content, such as a mesh with texture.

20 Claims, 16 Drawing Sheets

ATTRIBUTE VALUE COMPRESSION FOR A THREE-DIMENSIONAL MESH USING GEOMETRY INFORMATION TO GUIDE PREDICTION

BACKGROUND

This application claims benefit of priority to U.S. Provisional Application Ser. No. 63/197,287, entitled "Attribute Value Compression for a Three-Dimensional Mesh Using Geometry Information to Guide Prediction," filed Jun. 4, 2021, and which is hereby incorporated herein by reference in its entirety.

Technical Field

This disclosure relates generally to compression and decompression of attribute information for three-dimensional meshes having associated textures or attributes.

Description of the Related Art

Various types of sensors, such as light detection and ranging (LIDAR) systems, 3-D-cameras, 3-D scanners, etc. may capture data indicating positions of points in three-dimensional space, for example positions in the X, Y, and Z planes. Also, such systems may further capture attribute information in addition to spatial information for the respective points, such as color information (e.g., RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up volumetric visual content comprising mesh vertices each having associated spatial information and one or more associated attributes, along with mesh connectivity information and/or attribute connectivity information. In some circumstances, visual volumetric content may be generated, for example in software, as opposed to being captured by one or more sensors. In either case, such visual volumetric content may include large amounts of data and may be costly and time-consuming to store and transmit.

Such visual volumetric content may be represented by a three-dimensional mesh comprising a plurality of polygons (such as triangles) with connected vertices that model a surface of visual volumetric content. Moreover, texture or attribute values may be overlaid on the mesh to represent the attribute or texture of the visual volumetric content when modelled as a three-dimensional mesh.

SUMMARY OF EMBODIMENTS

In some embodiments, a system includes one or more sensors configured to capture points representing an object in a view of the sensor and to capture texture or attribute values associated with the points of the object. The system also includes one or more computing devices storing program instructions, that when executed, cause the one or more computing devices to generate a three-dimensional mesh that models the points of the object using vertices and connections between the vertices that define polygons of the three-dimensional mesh, such as mesh triangles. Also, in some embodiments, a three-dimensional mesh may be generated without first being captured by one or more sensors. For example, a computer graphics program may generate a three-dimensional mesh with an associated texture or associated attribute values to represent an object in visual volumetric content.

In some embodiments, a non-transitory computer-readable medium stores program instructions for generating mesh geometry information and attribute information for visual volumetric content. The mesh information includes vertices information indicating locations of vertices of a mesh and connectivity information for connecting the vertices to form polygons, such as triangles. The polygons may form a geometric representation of the visual volumetric content, such as a 2D or 3D mesh.

In some embodiments, the non-transitory computer-readable medium stores program instructions for generating attribute information for the visual volumetric content. The attribute information may include texture coordinates, and (optionally) texture connectivity information. The texture coordinates may indicate values for pixel coordinates in a 2D image frame that are to be associated with respective ones of the mesh vertices of the geometric representation. The texture connectivity information may indicate how the texture coordinates are to be connected. For example connections between texture coordinates, such as triangles, in an attribute representation may map to corresponding triangles in the geometric representation. However, in some embodiments the triangles in the attribute representation may be in 2D while the triangles in the geometric representation may be in 3D. Thus, the triangles in the attribute representation may be modified as compared to corresponding triangles in the geometric representation. For example, a conformal mapping may be used to map triangles between the 3D geometric representation and the 2D attribute representation. When a conformal mapping is used, triangle vertices angles may be preserved, though triangle areas and/or side lengths may be modified when mapped from 3D to 2D. For example, the 3D triangles may be "flattened" when mapped from 3D to 2D. Nevertheless, preservation of angles between triangles in the 3D geometric representation and corresponding triangles in the 2D attribute representation enables efficient prediction by leveraging the angle relationships that are persevered. For example, as discussed in more detail below, an orthogonal projection may be used to take advantage of these known angle relationships for vertices of conformally mapped triangles to predict a third vertex of a triangle in the 2D attribute representation when two other values for two other vertices of the triangle are known in the 2D attribute representation and three vertices locations are known in the 3D geometric representation.

Additionally, in some embodiments, the program instructions may adaptively select a prediction technique to be used to predict an attribute value for a mesh vertex, wherein multiple prediction techniques are available to be selected from based on relationships between a triangle in a geometric representation and a corresponding triangle in an attribute representation. Also in some embodiments, a prediction technique may be adaptively selected based on a resulting compression efficiency if the given prediction technique is selected and/or an amount of distortion introduced if the given prediction technique is selected. For example, a set of available prediction techniques that are candidates for selection may be determined, for example based on a number of already predicted or signaled attribute values in the attribute representation for a given triangle or set of triangles. Furthermore, a prediction technique to be used may be adaptively selected based on results of a rate distortion optimization (RDO) analysis, or other optimization.

In some embodiments, the attribute values in an attribute representation may be texture coordinates that indicate pixels of a separate 2D attribute image frame that comprises additional attribute information for the visual volumetric content, such as color values, reflectively values, normal vector values, etc. In some embodiments, the additional attribute information is grouped into texture patches or attribute patches that are packed into the 2D image frame. The texture or attribute patches indicate texture or attribute values for corresponding portions of the mesh when the attribute or texture patches are projected onto the mesh. The texture or attribute patches may be represented as two-dimensional patch images. The texture coordinates may indicate how the pixels of the attribute or texture patches are to be matched to corresponding mesh vertices of the geometric representation.

In some embodiments, to compress the attribute information, the program instructions, when executed using one or more processors cause the one or more processors to identify triangles in the geometric representation of the volumetric visual content based on received or generated mesh geometry information and for respective ones of the identified triangles predict an attribute value for a third vertex of a respective triangle. The prediction is based on signaled, or previously predicted, attribute values for two other vertices of the respective triangle and a geometric correlation between the respective triangle in the geometric representation and a corresponding representation of the respective triangle in the attribute information. To compress the attribute information, the program instructions further cause the one or more processors to determine an attribute correction value for the predicted attribute value based on comparing the predicted attribute value for the third vertex to an attribute value for the third vertex indicated in the received or generated attribute information. A compressed version of the attribute information may include entropy encoded ones of the determined attribute correction values and one or more signaled attribute values for at least one of the vertices of the identified triangles (e.g. at least one starting attribute value that may be used to predict other attribute values).

In some embodiments, to decompress the attribute information, the program instructions, when executed using one or more processors cause the one or more processors to identify triangles in a geometric representation of the volumetric visual content and for respective ones of the identified triangles predict an attribute value for a third vertex of a respective triangle based on signaled, or previously predicted, attribute values for two other vertices of the respective triangle and a geometric correlation between the respective triangle in the geometric representation and a corresponding representation of the respective triangle in the attribute information. Additionally, to decompress the attribute information, the program instructions, when executed using one or more processors cause the one or more processors to apply attribute correction values included in the compressed attribute information to the predicted attribute values to generate decompressed attribute values for the third vertices of the respective triangles. In some embodiments, a predicted attribute value for a given triangle may be used to predict an attribute value for a third vertex of another triangle, for example when the triangles share one or more vertices.

In some embodiments, the program instructions cause the one or more processors to video encode (or video decode) image frames comprising the patch images (for example as may be referenced via texture coordinates that are compressed and decompressed as attribute values as described above). In some embodiments, the program instructions may utilize a video encoder or decoder in accordance with the High Efficiency Video Coding (HEVC) standard or other suitable standards such as, the Advanced Video Coding (AVC) standard, the AOMedia Video 1 (AV1) video coding format, etc. In some embodiments, the encoder or decoder may utilize an image encoder or decoder in accordance with a Motion Picture Experts Group (MPEG) or a Joint Photography Experts Group (JPEG) standard, etc.

Figure 1:
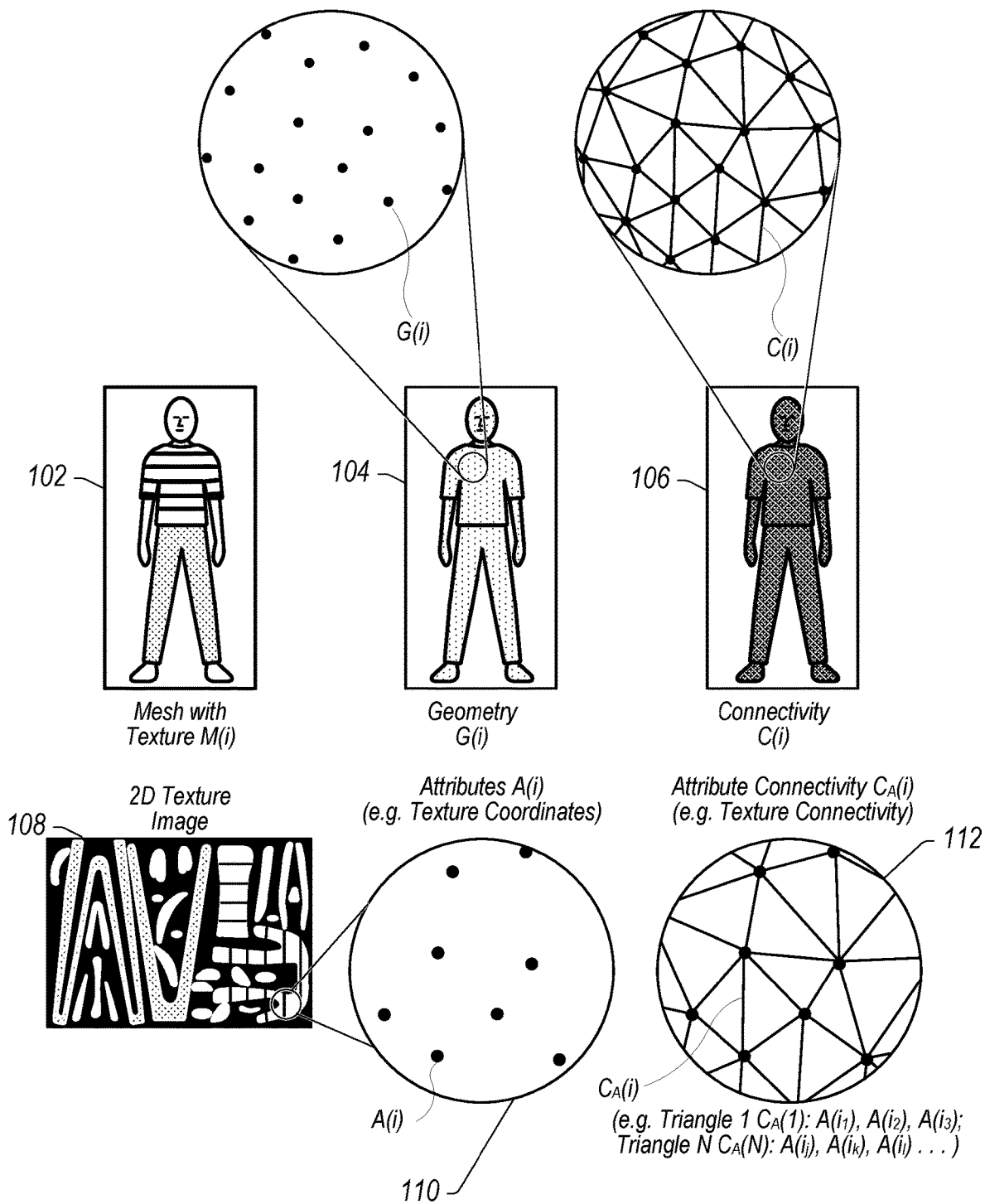
FIG. 1 illustrates visual volumetric content including geometry and connectivity information of a geometrical representation and attribute values (e.g. texture coordinates) and attribute connectivity (e.g. texture connectivity) of an attribute representation, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture visual volumetric content comprising thousands or millions of points in 2-D or 3-D space, such as via LIDAR systems, has increased. Large visual volumetric content files may be costly and time-consuming to store and transmit. For example, communication of visual volumetric content over the Internet requires time and network resources, resulting in latency.

In some embodiments, an encoder generates compressed visual volumetric content to reduce costs and time associated with storing and transmitting visual volumetric content. In some embodiments, a system may include an encoder that compresses attribute and/or spatial information of a visual volumetric content file such that the visual volumetric content file may be stored and transmitted more quickly than non-compressed visual volumetric content and in a manner that the visual volumetric content file may occupy less storage space than non-compressed visual volumetric content. In some embodiments, compression of attributes for vertices in visual volumetric content may enable the visual volumetric content to be communicated over a network in real-time or in near real-time. For example, a system may include a sensor that captures attribute information about points in an environment where the sensor is located, wherein the captured points and corresponding attributes make up visual volumetric content. The system may also include an encoder that compresses the captured visual volumetric content attribute information. The compressed attribute information of the visual volumetric content may be sent over a network in real-time or near real-time to a decoder that decompresses the compressed attribute information of the visual volumetric content. The decompressed visual volumetric content may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a visual volumetric content may be sent with compressed spatial information for the visual volumetric content, such as an encoded mesh. In other embodiments, spatial information and attribute information may be separately encoded and/or separately transmitted to a decoder.

In some embodiments, a system may include a decoder that receives one or more sets of visual volumetric content data comprising compressed attribute information via a network from a remote server or other storage device that stores the one or more visual volumetric content files. For example, a 3-D display, a holographic display, or a head-mounted display may be manipulated in real-time or near real-time to show different portions of a virtual world represented by visual volumetric content. In order to update the 3-D display, the holographic display, or the head-mounted display, a system associated with the decoder may request visual volumetric content data from the remote server based on user manipulations of the displays, and the visual volumetric content data may be transmitted from the remote server to the decoder and decoded by the decoder in real-time or near real-time. The displays may then be updated with updated visual volumetric content data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, texture attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in visual volumetric content. For example, in some embodiments, a gyroscope or accelerometer, may capture motion information to be included in visual volumetric content as an attribute associated with one or more mesh vertices of the visual volumetric content. For example, a vehicle equipped with a LIDAR system, a 3-D camera, or a 3-D scanner may include the vehicle's direction and speed in visual volumetric content captured by the LIDAR system, the 3-D camera, or the 3-D scanner. For example, when points in a view of the vehicle are captured, they may be included in visual volumetric content, wherein the visual volumetric content includes mesh information representing the captured points and associated motion information corresponding to a state of the vehicle when the points were captured.

Attribute information such as texture coordinates, normal vectors, color information (e.g., RGB values, YCbCr values, etc.) are associated with mesh vertices and may represent a significant part of the overall mesh information for volumetric visual content. Thus, compressing an amount of information needed to be signaled to communicate the attribute information improves overall compression efficiency of visual volumetric content.

In some embodiments, a low complexity method of compressing attribute information is to leverage geometry and connectivity information that is already being signaled for the visual volumetric content as part of the geometry information for the mesh representation. In some embodiments, attribute prediction techniques as described herein may utilize quantization to convert floating point values into fixed point representations for intermediate calculations. Thus, differences in implementation in floating point calculations for different decoders does not affect performance, in some embodiments. Also, in some embodiments, intermediate calculations, such as a square root function, may be performed using an approximated square root in order to simplify the intermediate calculations, wherein any differences between the actual square root result and the approximated square root result are accounted for in the signaled attribute correction values (e.g., residual values) applied to predicted attribute values that are predicted at a decoder.

While several of the examples described herein focus on compressing and decompressing texture coordinates using geometry information guided prediction, in some embodiments, the same techniques described herein may be applied to compress and decompress any attribute values using geometry information guided prediction.

FIG. 1 illustrates visual volumetric content including geometry and connectivity information of a geometrical representation and attribute values (e.g., texture coordinates) and attribute connectivity (e.g., texture connectivity) of an attribute representation, according to some embodiments.

For example, in some embodiments, visual volumetric content 102 includes a mesh with texture, which is communicated as geometry information 104, connectivity information 106, a 2D texture 108, attribute values 110, and attribute connectivity 112. The geometry information and connectivity information may collectively define a mesh geometry for the volumetric visual content (e.g., a geometric representation). For example, the geometry information 104 includes vertex coordinates G(i) for vertices of a mesh and the connectivity information 106 includes information indicating connections C(i) for connecting the mesh vertices G(i) via one or more edges to form polygons, such as triangles. The polygons (e.g., triangles) collectively form a surface of the mesh.

In some embodiments, the attribute values 110 include attribute values to be associated with the respective vertices G(i) of the mesh. In some embodiments, there may not be a one-to-one ratio between attribute values A(i) and vertices G(i). For example, some vertices may be assigned more than one attribute value A(i) or some vertices may not be assigned an attribute value A(i). However, in some embodiments, there may be a one-to-one ratio between the attribute values A(i) and the vertices G(i), wherein each vertex is assigned an attribute value A(i). In some embodiments, the attributes may use a same connectivity as the mesh, such as connectivity information 106, or in some embodiments a separate attribute connectivity 112 may be used. For example, attribute connectivity information 112 may include information indicating connections ($A_c(i)$), such as sets of attribute values A(i) that form vertices of a triangle in the attribute information (e.g., triangles defined via attribute values 110 and attribute connectivity 112). For example, the attribute values 110 may be associated with vertices of the mesh (e.g., vertices G(i)), but in the attribute information representation, the connectivity may be different, such as forming larger or smaller triangles.

In some embodiments, the attribute values A(i) comprise texture coordinates indicating coordinates for pixels of a 2D texture image 108 that comprises attribute values to be associated with the respective vertices of the mesh. For example, a given texture coordinate TC(i) (wherein the attribute values A(i) are texture coordinates TC(i)), may indicate a position such as (u,v) of a pixel in a 2D texture image 108. Wherein the information stored in a pixel located at position (u,v) is to be associated with a mesh vertex G(i) that corresponds to the texture coordinate TC(i).

Figure 2:
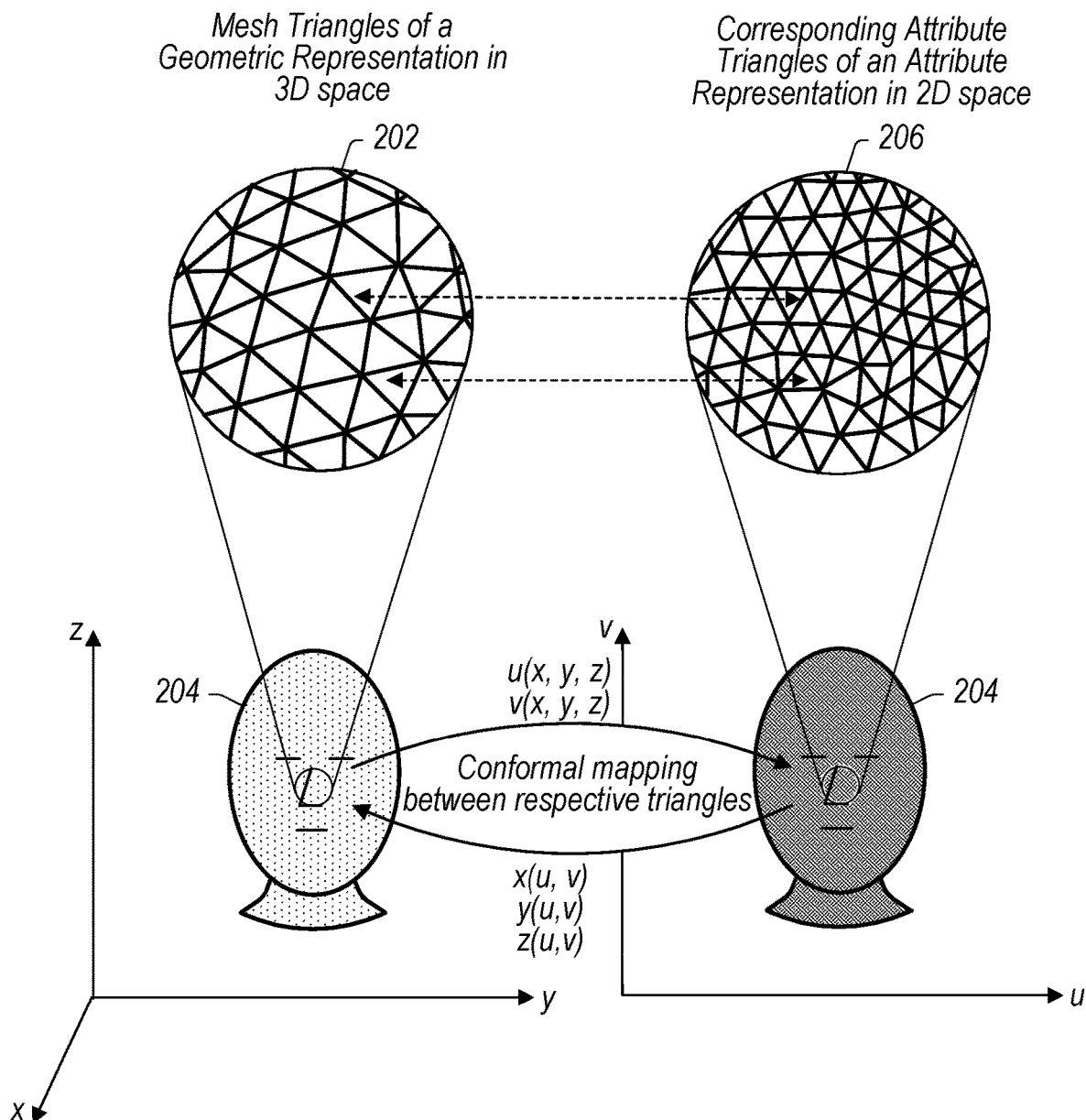
FIG. 2 illustrates an example conformal mapping between three-dimensional (3D) triangles of a geometrical representation and two-dimensional (2D) triangles of an attribute representation, according to some embodiments.

As further discussed in FIG. 2, in some embodiments conformal mapping relationships may be maintained between triangles in a geometric representation such as the triangles shown via connectivity information 106 and corresponding triangles in a 2D attribute representation, such as 2D texture image 108.

FIG. 2 illustrates an example conformal mapping between three-dimensional (3D) triangles of a geometrical representation and two-dimensional (2D) triangles of an attribute representation, according to some embodiments.

In some embodiments, a conformal mapping preserves angles of a triangle, such as in a geometric representation and in an attribute information representation. This means that a given vertex of a triangle, which may, for example form a 45° angle with two sides of the triangle may retain the 45° angle when mapped from a geometric representation to an attribute information representation. Though the area of the triangle or lengths of the sides of the triangle may be adjusted when being mapping between the two representations. As an example, a globe of the world may be represented by polygons (such as squares or rectangles on the globe corresponding to lines of longitude and latitude). The angles of the polygons may be locally preserved when being mapped from a 3D globe to a 2D map according to a conformal mapping such that the squares or rectangles have 90° angles in both the 3D globe and in the 2D flattened globe, though the sides of the polygons may change in length when mapped from 3D to 2D.

As another example, FIG. 2 illustrates a conformal mapping between triangles of a 3D mesh 202 representing a portion of a person 204's nose and a corresponding 2D representation 206 of the same portion of the person 204's nose wherein the triangles have been conformally mapped between the 3D representation 202 and the 2D representation 206. For example, in some embodiments, the 3D representation 202 may be communicated as geometry information comprising mesh vertices G(i) 104 and connectivity C(i) 106. The 2D representation may be communicated as a 2D texture image, such as texture image 108.

Since the triangles are conformally mapped between the 3D geometry representation and the 2D texture image and since the texture coordinates map vertices in the 3D geometry representation to pixel coordinates in the 2D texture image, geometric correlations due to the preservation of angles can be used to predict a texture coordinate for a vertex of a triangle in attribute representation. This may be done if texture coordinates for two other vertices of the triangle are known and vertex coordinates in 3D are known for all three vertices of the triangle in a geometric representation. Said another way, if G(i) and C(i) are known for all three vertices of a triangle and TC(i) are known for two of the three vertices of the triangle, the texture coordinate TC(i) for the third vertex can be predicted based on geometric correlations, such as preservation of angles between the triangle in the geometric representation and the conformally mapped version of the same triangle in the attribute representation (e.g., 2D texture image 108).

In some embodiments, various prediction techniques may be used that take advantage of these geometric correlations to enable prediction of attribute values, such as texture coordinates. Also in some embodiments, prediction techniques may be adaptively selected based on known (e. g. signaled or previously predicted) attribute values, such as texture coordinates. As examples, FIGS. 5A-5B describe an orthogonal projection prediction technique with signaling of a projection direction, FIGS. 6A-6B describe an orthogonal projection prediction technique that does not require signaling of a projection direction, FIGS. 7A-7B describe a parallelogram prediction technique, and FIG. 8 describes an example embodiment of adaptively selecting between various supported prediction techniques. Any of these prediction techniques may take advantage of geometric correlations due to a conformal mapping as described in FIG. 2 and which may be used to compress attribute information, such as attribute values 110. For example, in some embodiments attribute values 110 may be predicted at a decoder instead of being explicitly signaled in a bit stream, wherein one or more starting attribute values are signaled in the bit stream for use by a prediction technique of a decoder, and wherein the bit stream includes attribute correction values (e.g. residual values) to be applied to attribute values predicted at a decoder.

Figure 3A:
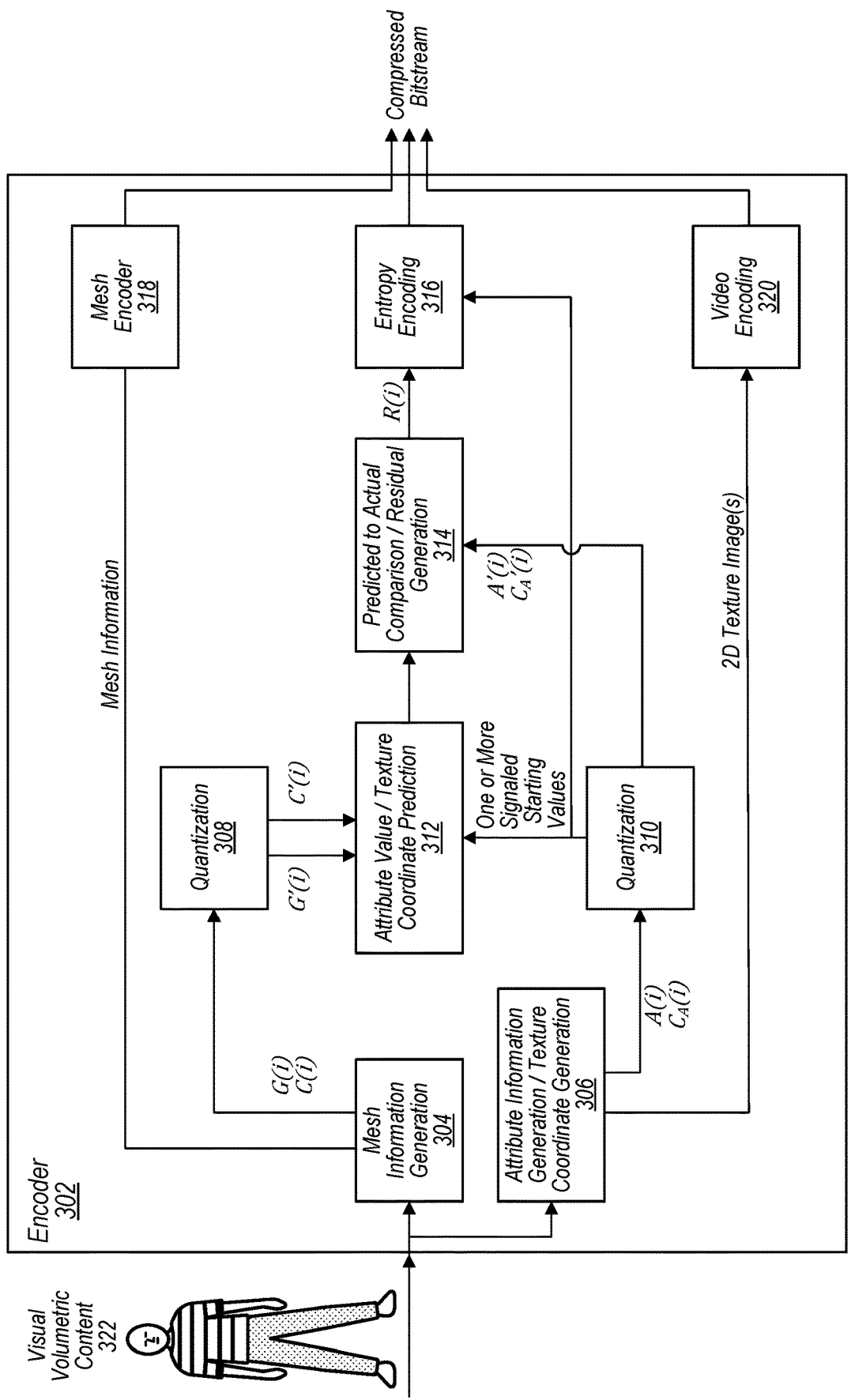
FIG. 3A illustrates an example encoder for compressing and/or encoding visual volumetric content using geometry guided attribute value prediction, according to some embodiments.

FIG. 3A illustrates an example encoder for compressing and/or encoding visual volumetric content using geometry guided attribute value prediction, according to some embodiments.

In some embodiments, an encoder that utilizes geometry guided attribute value prediction, such as encoder 302, receives visual volumetric content 322. The visual volumetric content may have been captured by sensors, such as LIDAR sensors, cameras capturing a scene from multiple points of view, 3D scanners, etc., or the visual volumetric content may have been computer generated. The visual volumetric content 322 may be converted into mesh information via mesh information generation module 304 and converted into attribute information via attribute information generation and/or texture coordinate generation module 306.

The mesh information may include mesh vertices (e.g. geometry information G(i), which may be similar to geometry information 104 described in FIG. 1) and connectivity information (e.g. C(i), which may be similar to connectivity information 106 described in FIG. 1). The geometry information and the connectivity information may be quantized via quantization module 308, which results in quantized geometry information G'(i) and quantized connectivity information C'(i). As an example, the quantized geometry information and the quantized connectivity information may be represented as fixed point integer values, whereas the non-quantized geometry information and the non-quantized connectivity information may be represented as floating point values.

The attribute information may include a 2D texture image, such as 2D texture image 108 illustrated in FIG. 1 and attribute values A(i), such as attribute values 110 illustrated in FIG. 1. The attribute information may also optionally include attribute connectivity $A_c(i)$, such as attribute connectivity 112 illustrated in FIG. 1. The 2D texture image portion of the attribute information may be video encoded via video encoding module 320. The attribute values A(i) and optionally the attribute connectivity $A_c(i)$ may be quantized via quantization module 310, which results in quantized attribute values A'(i) and quantized attribute connectivity information $A_c'(i)$. As an example, the quantized attribute values and the quantized attribute connectivity may be represented as fixed point integer values, whereas the non-quantized attribute values and the non-quantized attribute connectivity may be represented as floating point values. For example, quantized texture coordinates may be fixed point integers.

In some embodiments, one or more of the quantized attribute values and/or quantized attribute connectivities may be explicitly signaled in the bit stream as one or more starting values for prediction.

The quantized attribute values A'(i) and the quantized attribute connectivity $A_c'(i)$ may be provided to the attribute value and/or texture coordinate prediction module 312. The attribute value and/or texture coordinate prediction module 312 also receives the quantized geometry information G'(i) and the quantized connectivity C'(i). The attribute value and/or texture coordinate prediction module 312 adaptively selects a prediction technique to use for predicting respective attribute values A'(i) based on previously predicted attribute values A'(i) or explicitly signaled starting values A'(i). The prediction is further based on geometry information, such as G'(i) and C'(i). For example, attribute value and/or texture coordinate prediction module 312 may follow a process similar to the process shown in FIG. 8 to adaptively select a prediction technique and may perform the prediction, for example using one of the prediction techniques as discussed in FIGS. 5-7.

Predicted to actual comparison module (e.g., residual value generation module) 314 compares the predicted attribute values predicted via attribute value and/or texture coordinate prediction module 312 and the actual attribute values (quantized) generated at attribute information/texture coordinate generation module 306 based on the received visual volumetric content 322. The resulting residual values R(i) are provided to entropy encoder 316 which entropy encodes the residual values R(i) and any explicitly signaled starting values. The mesh geometry information is also encoded via mesh encoder 318, and the combined bit stream includes the encoded mesh information from mesh encoder 318, the encoded entropy values from entropy encoder 316 and the one or more video encoded 2D texture images from video encoder 320. In some embodiments, the video encoded information, the mesh encoded information, and the entropy encoded information may be signaled together or separately, for example in a common bit stream or in separate bit streams.

Furthermore, in some embodiments, respective adaptively selected prediction techniques selected to predict the attribute values A(i) may be included in the entropy encoded bit stream as associated values with the respective residual values. For example, in some embodiments, an encoder and a decoder may use a same indexing scheme to identify prediction techniques and a two-bit or three-bit value may be signaled to indicate a prediction technique to use to predict a given attribute value. Though, in some embodiments, an encoder and a decoder may utilize similar adaptive prediction scheme selection processes, such that a decoder can implicitly determine a prediction technique to use based on context without an encoder explicitly signaling the prediction technique in the bit stream.

Figure 3B:
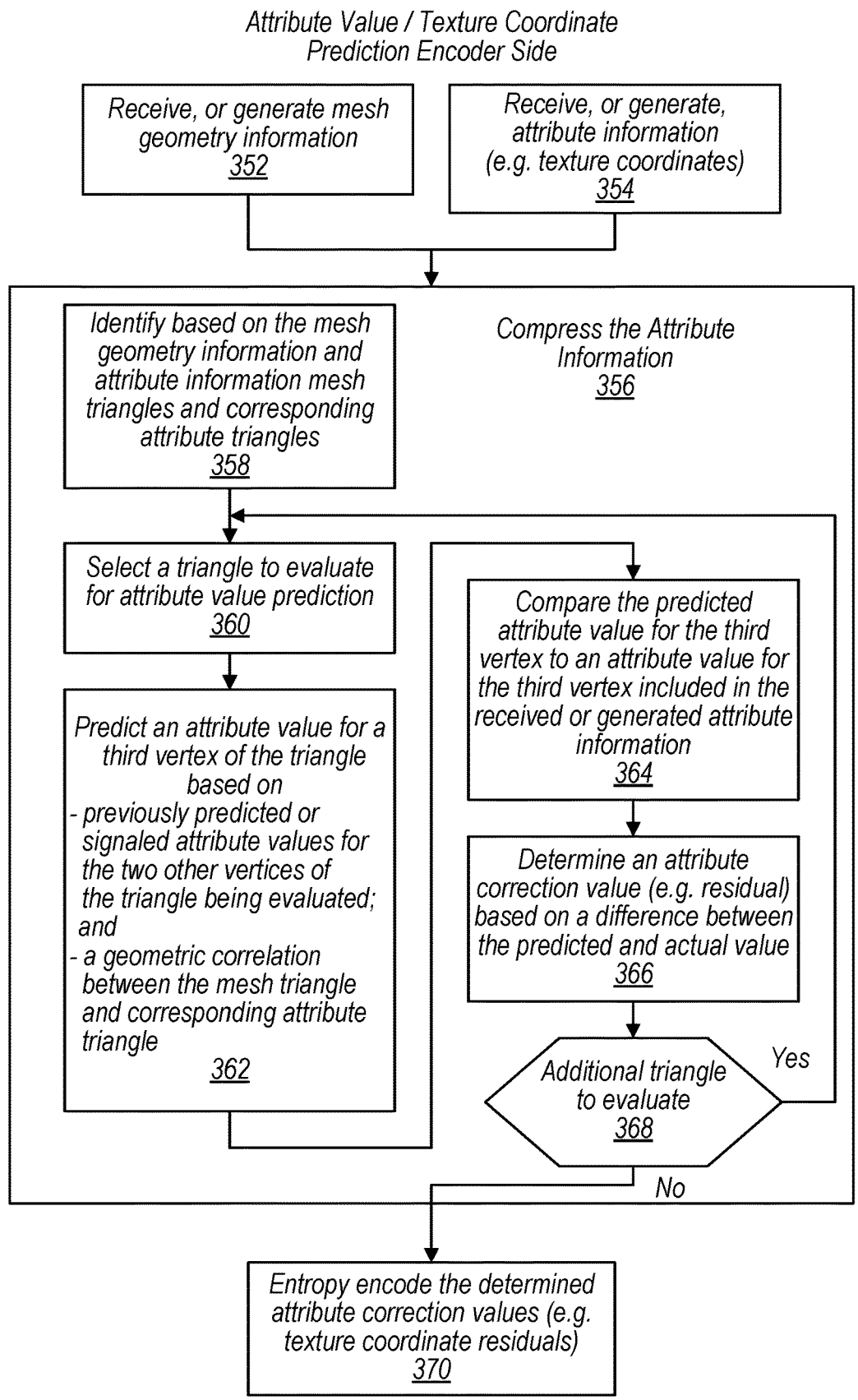
FIG. 3B illustrates an example process for compressing and/or encoding visual volumetric content using geometry guided attribute value prediction, according to some embodiments.

FIG. 3B illustrates an example process for compressing and/or encoding visual volumetric content using geometry guided attribute value prediction, according to some embodiments.

At block 352 an encoder receives or generates mesh geometry information and at 354 the encoder receives or generates attribute information, such as texture coordinates and/or an associated 2D texture image. At 356 the encoder compresses the attribute information and at 370 the encoder entropy encodes the compressed attribute information (e.g., determined attribute correction values). To compress the attribute information, at block 358 the encoder identifies sets of corresponding triangles in geometry representation and in the attribute representation based on the mesh geometry information (e.g. G(i) and C(i)) and the attribute information (e.g. A(i) and optionally $A_c(i)$). At block 360 the encoder selects a first triangle for which prediction is to be performed.

To perform attribute value prediction for the first (or next) selected triangle, at block 362 the encoder predicts an attribute value for a third vertex of the selected triangle based on previously predicted or signaled attribute values for two other vertices of the selected triangle and based on a geometric correlation between the selected triangle in the attribute representation and the corresponding triangle in the geometric representation, wherein 3D vertices coordinates for all three vertices of the triangle in the geometric representation are known from the quantized geometry information (e.g. G'(i) and C'(i)).

At block 364, the encoder compares the predicted attribute value for the third vertex of the selected triangle to the actual attribute value for the third vertex of the selected triangle wherein the received or generated attribute information comprises the actual attribute value for the third vertex of the selected triangle. Based on the comparison, at block 366, the encoder determines an attribute correction value for the predicted attribute value for the third vertex of the selected triangle (e.g., a residual based on a difference between the predicted and actual value). Note that prediction at block 362 may further comprise adaptively selecting a prediction technique to use to perform the prediction.

At block 368 the encoder determines if there are additional triangles to evaluate. If so the process is repeated for the next triangle to evaluate. If not, the compression is completed. Note that in some embodiments different prediction techniques may be adaptively selected at block 362 for each triangle being evaluated. For example, an attribute value for a third vertex of a first triangle may be predicted using an orthogonal projection with projection direction signaling an attribute value for a third vertex of a next evaluated triangle may be predicted using a different prediction technique, such as an orthogonal projection without projection direction signaling, or a parallelogram prediction technique.

Figure 4A:
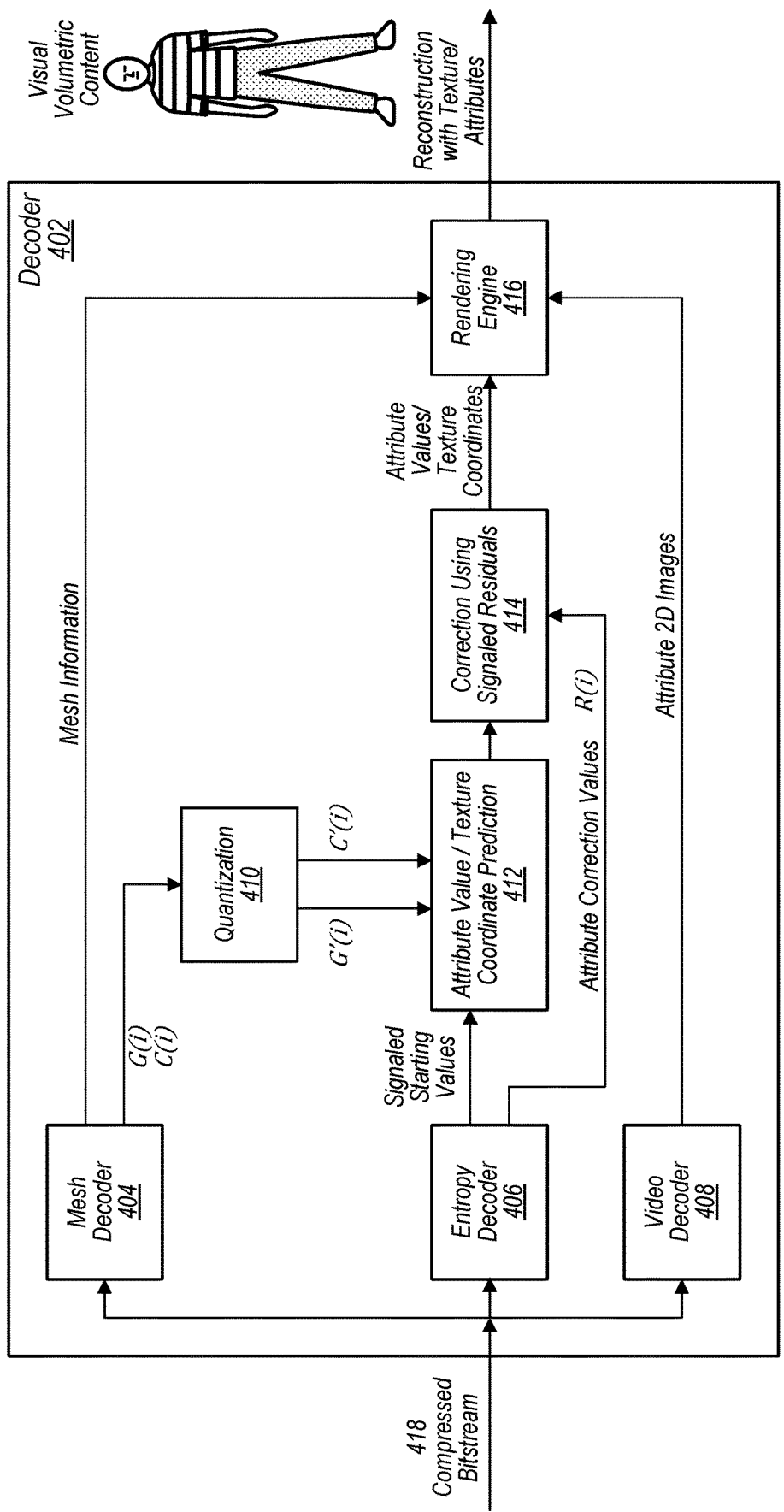
FIG. 4A illustrates an example decoder for decompressing and/or decoding visual volumetric content using geometry guided attribute value prediction, according to some embodiments.

FIG. 4A illustrates an example decoder for decompressing and/or decoding visual volumetric content using geometry guided attribute value prediction, according to some embodiments.

In some embodiments, a decoder, such as decoder 402, receives a compressed bit stream 418, which may be a compressed bitstream as generated by encoder 302. The compressed bit stream may include entropy encoded values, an encoded mesh, and one or more video encoded 2D attribute images (such as a 2D texture image). Mesh decoder 404 decodes the encoded mesh to generate geometry information including mesh vertices G(i) and mesh connectivity C(i). The entropy decoder 406 entropy decodes the entropy encoded residual values and/or entropy encoded starting point attribute value. The video decoder video decodes the encoded 2D attribute images. A quantization module 410 quantizes the geometry information to generate quantized geometry information G'(i) and C'(i). For example, quantization module 410 may convert floating point values into fixed point integers. The signaled starting point attribute values are provided to attribute value and/or texture coordinate prediction module 412. Attribute value and/or texture coordinate prediction module 412 also receives the quantized geometry information G'(i) and C'(i). Attribute value and/or texture coordinate prediction module 412 uses the received quantized geometry information, signaled attribute values, and already predicted attribute values to further predict other attribute values in a similar manner as described for attribute value and/or texture coordinate prediction module 312 described in FIG. 3A. The predicted attribute values are provided to correction using signaled residuals module 414 which applies the entropy decoded residual values R(i) to the predicted attribute values to generate decompressed attribute values. For example, in some embodiments the decompressed attribute values may be texture coordinates.

Rendering engine 416 receives the decoded mesh information, the decompressed attribute value and/or texture coordinates and the video decoded 2D attribute and/or texture images and uses these received streams to reconstruct the visual volumetric content.

In some embodiments, attribute value and/or texture coordinate prediction module 412 selects prediction techniques to be used to predict attribute values for respective triangles based on prediction technique index values included in the entropy encoded information. Or, in some embodiments, the attribute value and/or texture coordinate prediction module 412 contextually determines the prediction techniques to use following a contextual selection process that recreates adaptively selections performed at the encoder.

Figure 4B:
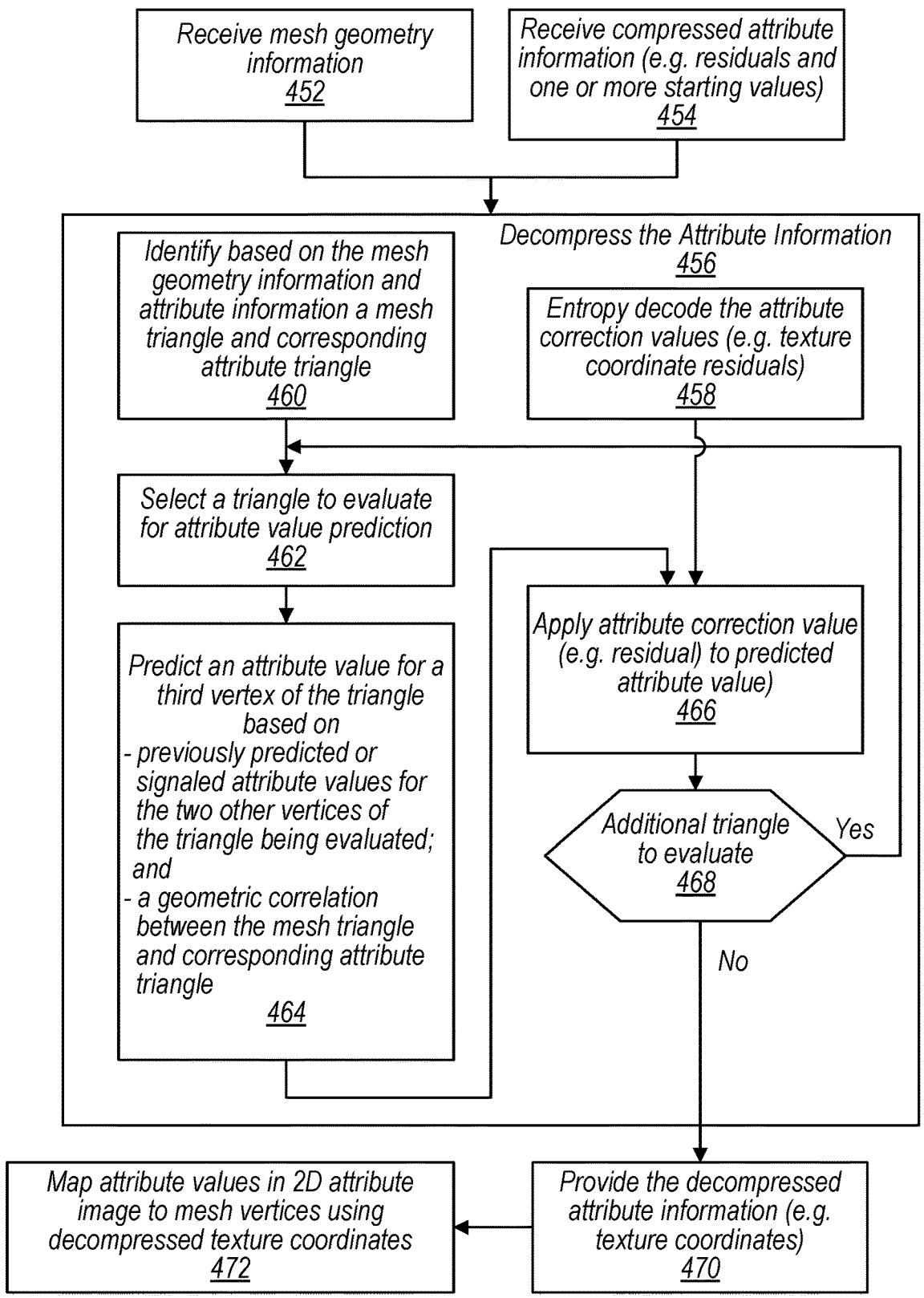
FIG. 4B illustrates an example process for decompressing and/or decoding visual volumetric content using geometry guided attribute value prediction, according to some embodiments.

FIG. 4B illustrates an example process for decompressing and/or decoding visual volumetric content using geometry guided attribute value prediction, according to some embodiments.

At block 452 the decoder receives mesh geometry information such as mesh encoded information that is mesh decoded via mesh decoder 404. At block 454 the decoder receives compressed attribute information such as entropy encoded residual values. Also, at blocks 452 the decoder decodes the mesh information. At block 458 the decoder entropy decodes the entropy encoded compressed attribute information. At block 456 the decoder decompresses the compressed attribute information.

To decompress the compressed attribute information, at block 460 the decoder identifies sets of corresponding triangles in geometry representation and in the attribute representation based on the mesh geometry information (e.g. G(i) and C(i)) and previously decompressed attribute information. At block 462 the decoder selects a first triangle for which prediction is to be performed.

To perform attribute value prediction for the first (or next) selected triangle, at block 464 the decoder predicts an attribute value for a third vertex of the selected triangle based on previously predicted or signaled attribute values for two other vertices of the selected triangle and based on a geometric correlation between the selected triangle in the attribute representation and the corresponding triangle in the geometric representation, wherein 3D vertices coordinates for all three vertices of the triangle in the geometric representation are known from the quantized geometry information (e.g. G'(i) and C'(i)).

At block 466, the decoder applies the received attribute correction value for the third vertex of the selected triangle to the predicted attribute value for the third vertex of the selected triangle. Note that prediction at block 464 may further comprise adaptively selecting a prediction technique to use to perform the prediction, such as may be explicitly signaled in the entropy encoded information or which may be implicitly determined at the decoder.

At block 468 the decoder determines if there are additional triangles to evaluate. If so the process is repeated for the next triangle to evaluate. If not, the decompression is completed. Note that in some embodiments different prediction techniques may be adaptively selected at block 464 for each triangle being evaluated. For example, an attribute value for a third vertex of a first triangle may be predicted using an orthogonal projection with projection direction signaling an attribute value for a third vertex of a next evaluated triangle may be predicted using a different prediction technique, such as an orthogonal projection without projection direction signaling, or a parallelogram prediction technique.

At block 470, the decompressed attribute information, such as decompressed texture coordinates are provided to a rendering engine and at block 472 the decompressed attribute information is used to map attribute values in a 2D attribute image to mesh vertices using the decompressed texture coordinates.

Prediction Using Orthogonal Projection with Projection Direction Signaling

Figure 5A:
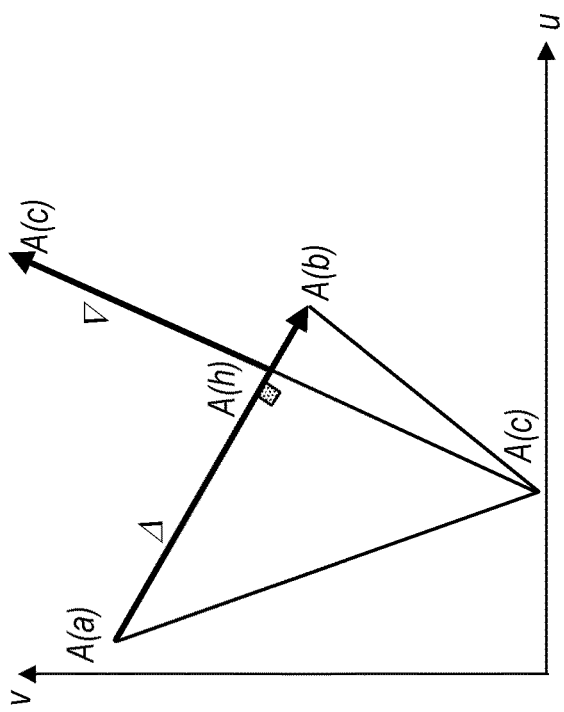
FIG. 5A illustrates a triangle in a 3D geometric representation and a corresponding conformally mapped triangle in a 2D attribute representation, wherein an orthogonal prediction technique is used to predict an attribute value (e.g. texture coordinate) for a third vertex of the triangle in the attribute representation when attribute values for two of the vertices of the triangle have already been predicted or signaled, according to some embodiments.
Figure 5A:
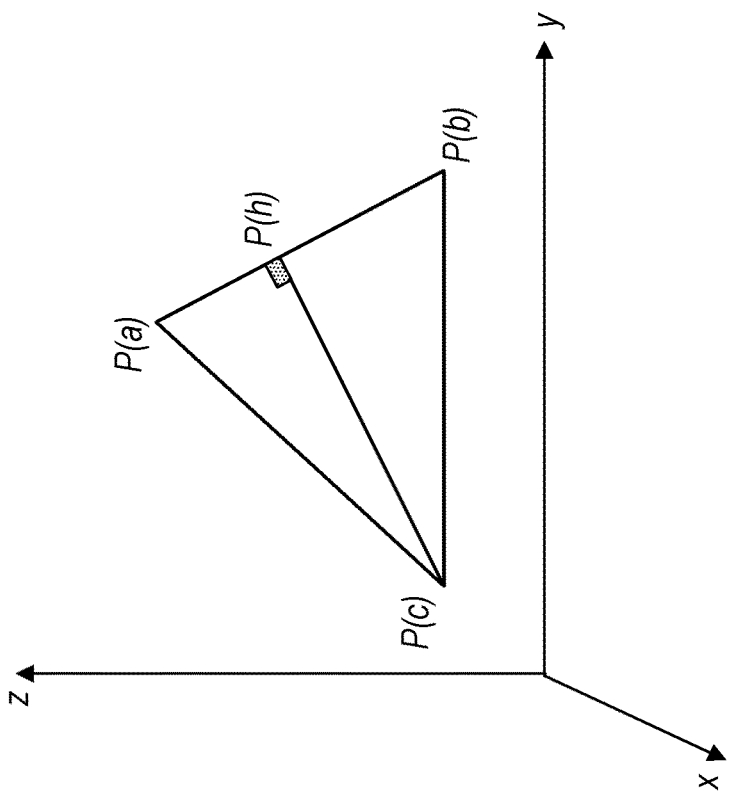

FIG. 5A illustrates a triangle in a 3D geometric representation and a corresponding conformally mapped triangle in a 2D attribute representation, wherein an orthogonal prediction technique is used to predict an attribute value (e.g., texture coordinate) for a third vertex of the triangle in the attribute representation when attribute values for two of the vertices of the triangle have already been predicted or signaled, according to some embodiments.

Geometry information G shown in FIG. 5A as geometric representation 500, wherein the positions of the mesh vertices are illustrated as $(P_v)_{v=1 \ldots V}$. For example, each mesh vertex G(i) is located at a position P(i) in 3D space. Attributes for the positions (and corresponding mesh vertices G(i) are specified by a set of attributes $(A_v)_{v=1 \ldots V}$. Conformal and quasi-conformal mesh mapping make it possible to preserve angles between the 3D domain and the 2D parametrization domain. For example, as shown in FIG. 2.

In FIG. 5A the geometric representation 500 includes a simple triangle (a,b,c) as an example. For prediction, it can be assumed that both the encoder and the decoder know the positions P(a), P(b), and P(c) of the 3 vertices a, b, and c, for example from the geometry information G(i) and/or the connectivity information C(i). Also, the prediction assumes that the encoder and decoder know the attribute values (e.g., texture coordinates) for two of the three vertices of the triangle being evaluated. For example, the attribute values (e.g., texture coordinates) may have already been predicted when evaluating another triangle that shares vertices with the given triangle being evaluated or may have been explicitly signaled as starting point attribute values for use in prediction. Thus, it is assumed that the encoder and decoder know the 2D texture coordinates A(a) and A(b) of the 2 vertices a and b. Note that in the discussion below, The Euclidean distance is given by $\|(x, y, z)\|_2^2 = x^2 + y^2 + z^2$.

In some embodiments, to predict the 2D texture coordinates A(c) associated with the vertex c, the following procedure is followed.

Let P(h) be the orthogonal projection of P(c) on the line (P(a), P(b)) and A(h) be the orthogonal projection of A(c) on the line (A(a), A(b)). The following ratios $\alpha$ and $\beta$ can be defined as follows:

$$\alpha = \frac{\|P(a) - P(c)\|_2^2}{\|P(a) - P(b)\|_2^2}$$

$$\beta = \frac{\|P(b) - P(c)\|_2^2}{\|P(a) - P(b)\|_2^2}$$

The distance between the points P(a) and P(h) is given by:

$$\|P(a) - P(h)\|_2 = \|P(a) - P(b)\|_2 \left(\frac{1 + \alpha - \beta}{2}\right)$$

Then the ratio rx can be defined as:

$$rx = \frac{\|P(a) - P(h)\|_2}{\|P(a) - P(b)\|_2} = \left(\frac{1 + \alpha - \beta}{2}\right)$$

The distance between the points P(c) and P(h) is given by:

$$\|P(c)-P(h)\|_2 = \|P(a)-P(b)\|_2 \sqrt{\alpha - rx^2}$$

Then the ratio ry can be defined as:

$$ry = \frac{\|P(c) - P(h)\|_2}{\|P(a) - P(b)\|_2} = \sqrt{\alpha - rx^2}$$

If it is supposed that the mapping preserves angles, the following relationships result:

$$\alpha = \frac{\|P(a) - P(c)\|_2^2}{\|P(a) - P(b)\|_2^2} = \frac{\|A(a) - A(c)\|_2^2}{\|A(a) - A(b)\|_2^2}$$

$$\beta = \frac{\|P(b) - P(c)\|_2^2}{\|P(a) - P(b)\|_2^2} = \frac{\|A(b) - A(c)\|_2^2}{\|A(a) - A(b)\|_2^2}$$

$$rx = \frac{\|P(a) - P(h)\|_2}{\|P(a) - P(b)\|_2} = \frac{\|A(a) - A(h)\|_2}{\|A(a) - A(b)\|_2}$$

$$ry = \frac{\|P(c) - P(h)\|_2}{\|P(a) - P(b)\|_2} = \frac{\|A(c) - A(h)\|_2}{\|A(a) - A(b)\|_2}$$

Under angle preservation or quasi angle-preservation hypothesis, A(c) is predicted with the predictor Â(c) defined as follows:

$$\begin{cases} \hat{A}(c) = A(a) + rx\Delta + ry\nabla & \text{if } \langle A(c) - A(a) | \nabla \rangle \geq 0 \\ \hat{A}(c) = A(a) + rx\Delta - ry\nabla & \text{otherwise} \end{cases}$$

Where:

$$\Delta = A(b) - A(a) = \begin{pmatrix} \Delta u \\ \Delta v \end{pmatrix} \text{ and } \nabla = \begin{pmatrix} -\Delta v \\ \Delta u \end{pmatrix}.$$

In order to determine the sign of ⟨A(c)−A(a)|∇⟩ A(c) is needed, which is available only on the encoder side. Therefore, sign information is explicitly encoded in the bit stream (e.g., by using a context adaptive binary arithmetic encoder). The decoder decodes first the sign information and then applies the right prediction strategy. Note that in some embodiments the square-root function could be replaced by any low complexity deterministic approximation.

Figure 5B:
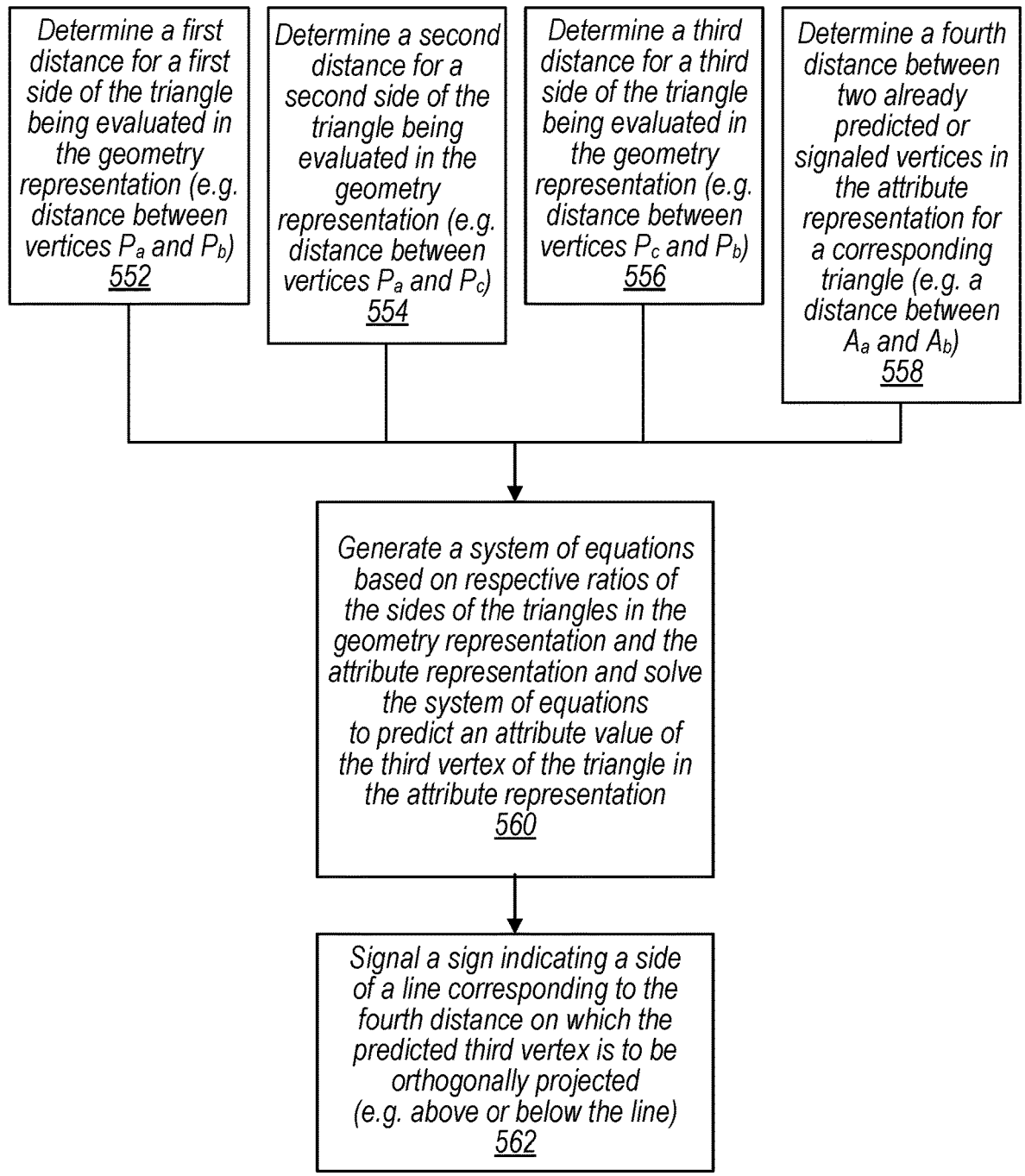
FIG. 5B illustrates a prediction process for predicting an attribute value for a third vertex of a conformally mapped triangle when attribute values for two of the vertices of the triangle have already been predicted or signaled, according to some embodiments.

FIG. 5B illustrates a prediction process for predicting an attribute value for a third vertex of a conformally mapped triangle when attribute values for two of the vertices of the triangle have already been predicted or signaled, according to some embodiments.

In some embodiments, a process as described in FIG. 5B may be carried out to perform an orthogonal projection with projection direction signaling as discussed above in regard to FIG. 5A.

For example, at blocks 552, 554, 556 respective distances for a first, second, and third side of the triangle in the geometric representation are determined (e.g., a distance between vertices $P_a$ and $P_b$, a distance between vertices $P_a$ and $P_c$, and a distance between vertices $P_c$ and $P_b$). Also, at block 558 a fourth distance is determined between two already predicted or signaled vertices in the attribute representation for a corresponding triangle (e.g. a distance between $A_a$ and $A_b$).

At block 560 the four determined distances (3 distances corresponding to sides of the triangle in the geometric representation and a distance for at least one side of a corresponding conformally mapped triangle in the attribute representation) are used to generate a system of equations as shown above based on respective ratios of the sides of the triangles in the geometry representation and the attribute representation. The equations of the system of equations are solved to predict an attribute value of the third vertex of the triangle in the attribute representation.

At block 562, a sign indicating a side of a line corresponding to the fourth distance on which the predicted third vertex is to be orthogonally projected is signaled with a determined residual value (e.g., a residual value generated based on the prediction as described in 314 of FIG. 3A).

Prediction Using Orthogonal Projection without Projection Direction Signaling

Figure 6A:
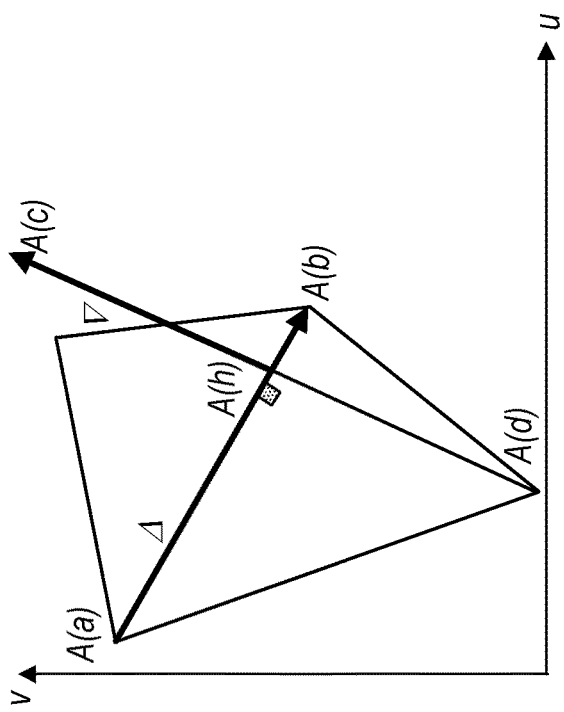
FIG. 6A illustrates a pair of adjoining triangles in a 3D geometric representation and a corresponding set of conformally mapped adjoining triangles in a 2D attribute representation, wherein an orthogonal prediction technique is used to predict an attribute value (e.g. texture coordinate) for a third vertex of one of the adjoining triangles in the attribute representation when attribute values for two of the vertices of the triangle have already been predicted or signaled and the attribute values for the adjoining triangle have already been predicted or signaled, according to some embodiments.
Figure 6A:
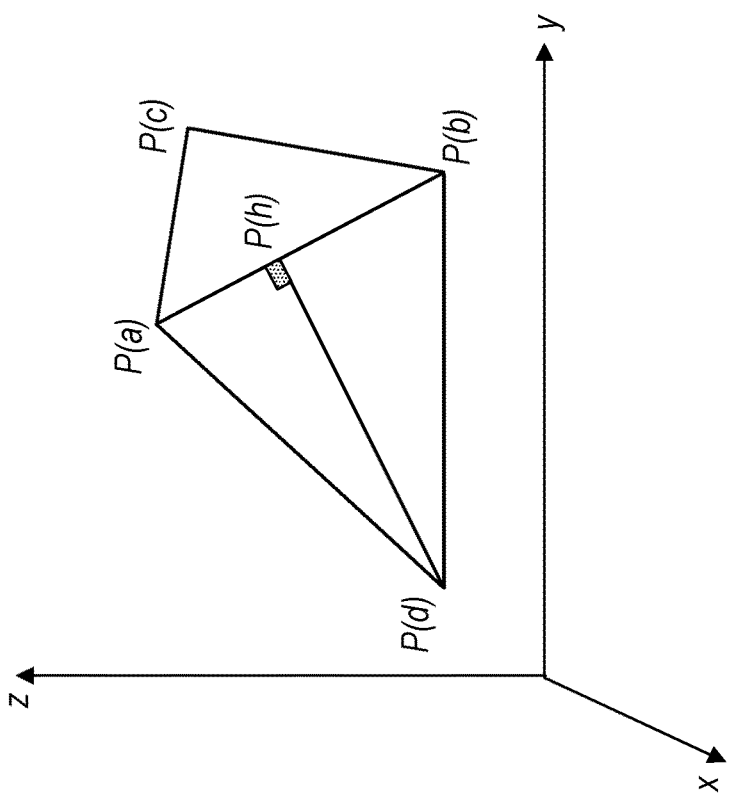

FIG. 6A illustrates a pair of adjoining triangles in a 3D geometric representation and a corresponding set of conformally mapped adjoining triangles in a 2D attribute representation, wherein an orthogonal prediction technique is used to predict an attribute value (e.g. texture coordinate) for a third vertex of one of the adjoining triangles in the attribute representation when attribute values for two of the vertices of the triangle have already been predicted or signaled and the attribute values for the adjoining triangle have already been predicted or signaled, according to some embodiments.

In the case shown in FIG. 6A, more neighboring points with already predicted or signaled attribute values are available in the attribute representation (e.g., 2D space of texture coordinates). For example, there are two connected triangles (a, b, c) and (b, a, d). It can be assumed that both the encoder and decoder know:

the 3D positions P(a), P(b), P(c), and P(d) of the four vertices a, b, c, and d; and the attribute values (A(a), A(b), and A(c) of the three vertices a, b, and c.

Thus, in order to predict the attribute A(d) associated with the vertex d a similar approach as described above for FIGS. 5A-5B can be employed by substituting the points c with d. Furthermore, explicitly encoding the sign information can be avoided by exploiting the extra new neighbor c. Here, the predictor Â(d) is defined as follows:

$$\begin{cases} \hat{A}(d) = A(a) + rx\Delta + ry\nabla & \text{if } \langle A(a) - A(c) | \nabla \rangle \geq 0 \\ \hat{A}(d) = A(a) + rx\Delta - ry\nabla & \text{otherwise} \end{cases}$$

Where $$\Delta = A(b) - A(a) = \begin{pmatrix} \Delta u \\ \Delta v \end{pmatrix} \text{ and } \nabla = \begin{pmatrix} -\Delta v \\ \Delta u \end{pmatrix}.$$

$$\alpha = \frac{\|P(a) - P(d)\|_2^2}{\|P(a) - P(b)\|_2^2}$$

$$\beta = \frac{\|P(b) - P(d)\|_2^2}{\|P(a) - P(b)\|_2^2}$$

$$rx = \left(\frac{1 + \alpha - \beta}{2}\right)$$

$$ry = \sqrt{\alpha - rx^2}$$

Figure 6B:
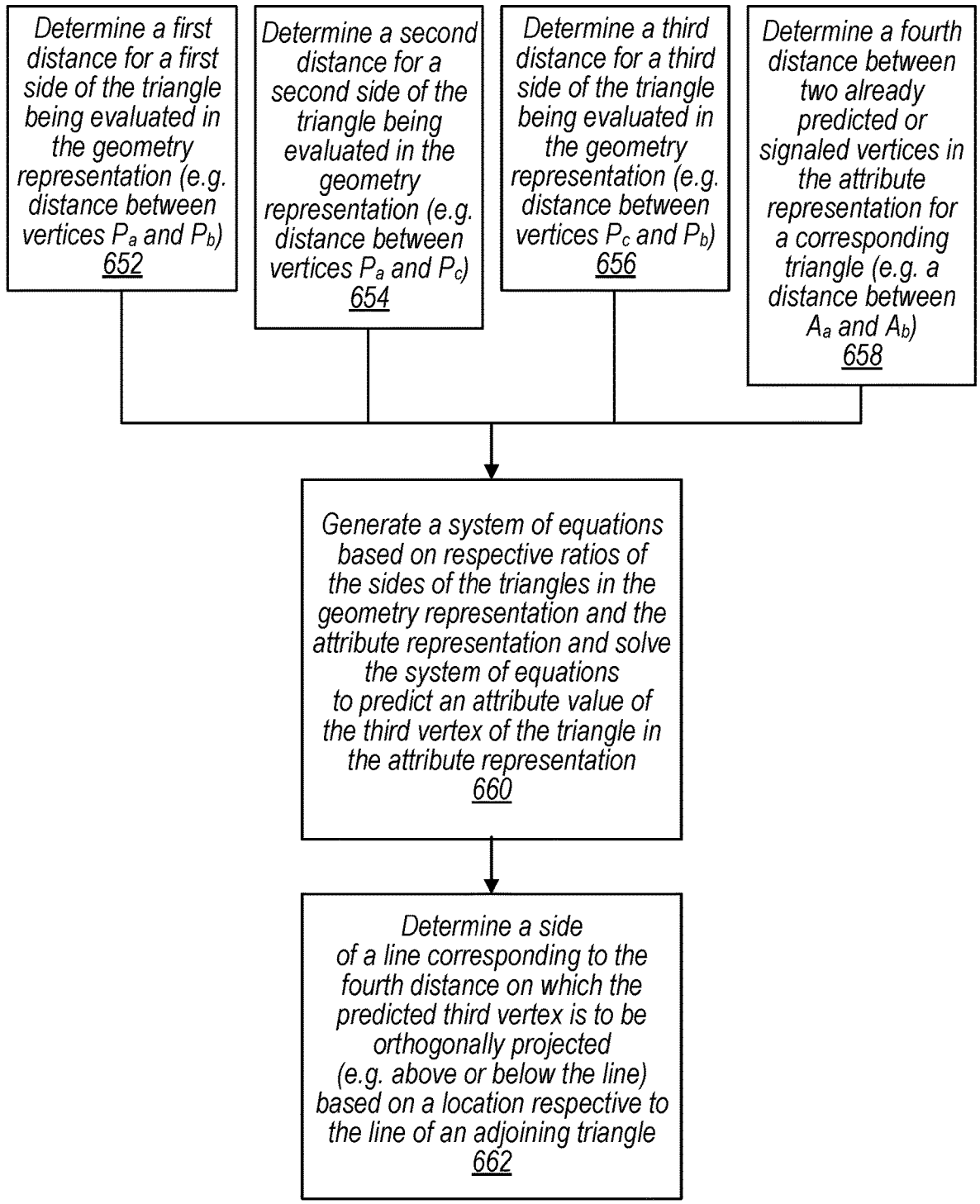
FIG. 6B illustrates a prediction process for predicting an attribute value for a third vertex of a conformally mapped triangle when attribute values for two of the vertices of the triangle have already been predicted or signaled and the attribute values for an adjoining triangle have already been predicted or signaled, according to some embodiments.

FIG. 6B illustrates a prediction process for predicting an attribute value for a third vertex of a conformally mapped triangle when attribute values for two of the vertices of the triangle have already been predicted or signaled and the attribute values for an adjoining triangle have already been predicted or signaled, according to some embodiments.

In some embodiments, a process as described in FIG. 6B may be carried out to perform an orthogonal projection without projection direction signaling as discussed above in regard to FIG. 6A.

For example, at blocks 652, 654, 656 respective distances for a first, second, and third side of the triangle in the geometric representation are determined (e.g., a distance between vertices $P_a$ and $P_b$, a distance between vertices $P_a$ and $P_c$, and a distance between vertices $P_c$ and $P_b$). This is similar to the process described above in regard to FIG. 5A. Also, at block 658 a fourth distance is determined between two already predicted or signaled vertices in the attribute representation for a corresponding triangle (e.g., a distance between $A_a$ and $A_b$). Again, this is similar to the process described in regard to FIG. 5A.

At block 660 the four determined distances (3 distances corresponding to sides of the triangle in the geometric representation and a distance for at least one side of a corresponding conformally mapped triangle in the attribute representation) are used to generate a system of equations based on respective ratios of the sides of the triangles in the geometry representation and the attribute representation. The equations of the system of equations are solved to predict an attribute value of the third vertex of the triangle in the attribute representation.

However, in contrast to the process described in FIGS. 5A and 5B, it is not necessary to signal a sign indicating a side of a line corresponding to the fourth distance on which the predicted third vertex is to be orthogonally projected with a determined residual value (e.g., a residual value generated based on the prediction as described in 314 of FIG. 3A). This is because the extra new neighbor c enables an inference to be drawn that the projection is to be on an opposite side of the line corresponding to the fourth distance, opposite neighbor c. Thus, at block 662 the encoder or decoder performing the prediction determines a side of a line corresponding to the fourth distance on which the predicted third vertex is to be orthogonally projected (e.g., above or below the line) based on a location respective to the line of an adjoining triangle, without having to signal a sign for the projection.

Parallelogram Prediction

Figure 7A:
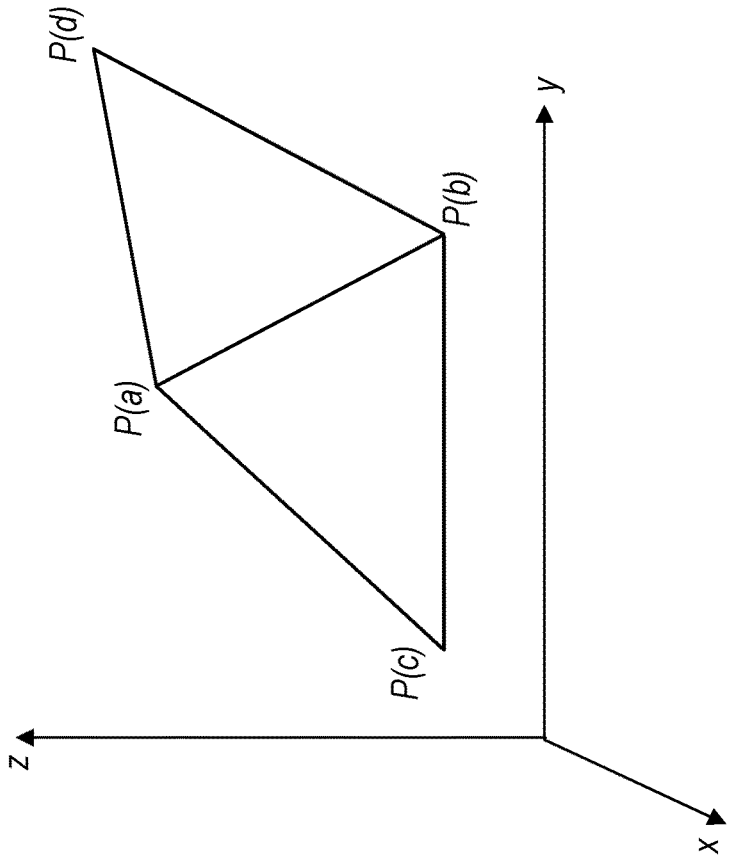
FIG. 7A illustrates a pair of adjoining triangles in a 3D geometric representation and a corresponding set of conformally mapped adjoining triangles in a 2D attribute representation, wherein the adjoining triangles form parallelograms, according to some embodiments.
Figure 7A:
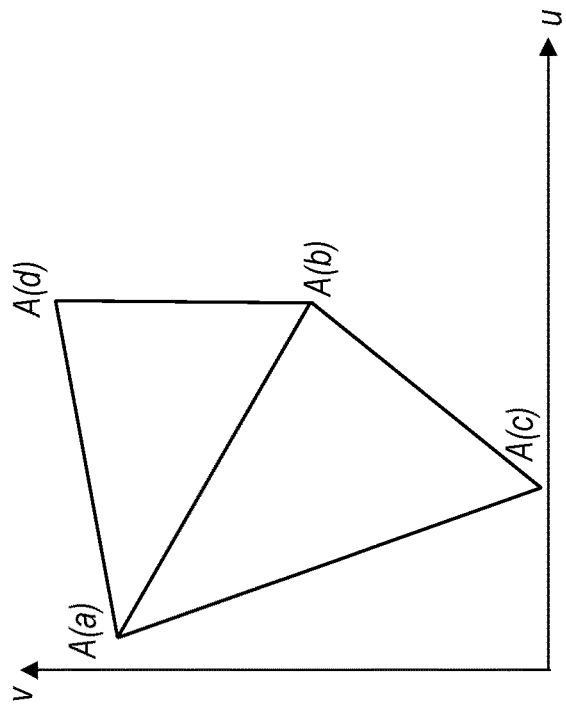

FIG. 7A illustrates a pair of adjoining triangles in a 3D geometric representation and a corresponding set of conformally mapped adjoining triangles in a 2D attribute representation, wherein the adjoining triangles form parallelograms, according to some embodiments.

FIG. 7A shows a simple example of two connected triangles (a, b, c) and (b, a, d). It can be assumed that both the encoder and decoder know:
the 3D positions P(a), P(b), P(c), and P(d) of the four vertices a, b, c, and d; and
the attribute values A(a), A(b), and A(c) of the three vertices a, b, and c.

To predict the attribute A(d) associated with the vertex d, it can be assumed that the predictor of A(d), denoted Â(d), has the following form:

$$\hat{A}(d) = w1 A(a) + w2 A(b) + w3 A(c)$$

where w1, w2 and w3 are three parameters that are derived as described below.

Note: if w1=1, w2=1 and w3=−1, the parallelogram prediction rule is given. The proposed form below is a generalization of parallelogram prediction, where w1, w2 and w3 could have any values.

In the parallelogram prediction technique w1, w2 and w3 can be derived based on the geometry information.

For example, $w_1^*$, $w_2^*$ and $w_3^*$ can be found such that:

$$(w_1^*, w_2^*, w_3^*) = arg \min_{(w1,w2,w3)} \|P(d) - w1 P(a) + w2 P(b) + w3 P(c)\|_2^2$$

This can be simplified by adding the following extra condition:

$$w1 + w2 + w3 = 1$$

Based on the above two relationships, the simplified minimization problem is described below:

$$(w_1^*, w_2^*, w_3^*) = arg \min_{(w1, w2, w3 = 1-w1-w2)} \left\| \begin{bmatrix} \Delta(a)_x & \Delta(b)_x \\ \Delta(a)_y & \Delta(b)_y \\ \Delta(a)_z & \Delta(b)_z \end{bmatrix} \begin{bmatrix} w1 \\ w2 \end{bmatrix} - \begin{bmatrix} \Delta(d)_x \\ \Delta(d)_y \\ \Delta(d)_z \end{bmatrix} \right\|_2^2$$

where $\Delta(a) = P(a) - P(c)$, $\Delta(b) = P(b) - P(c)$, and $\Delta(d) = P(d) - P(c)$.

Let M be the 3×2 matrix defined as follows:

$$M = \begin{bmatrix} \Delta(a)_x & \Delta(b)_x \\ \Delta(a)_y & \Delta(b)_y \\ \Delta(a)_z & \Delta(b)_z \end{bmatrix}$$

The solution ($w_1^*$, $w_2^*$, $w_3^*$) of (4) is given by:

$$\begin{bmatrix} w1 \\ w2 \end{bmatrix} = (M^t M)^{-1} M^t \Delta(d)$$

Let Q be the 3×2 matrix defined as follows:

$$Q = M^t M = \begin{bmatrix} \langle \Delta(a) | \Delta(a) \rangle & \langle \Delta(a) | \Delta(b) \rangle \\ \langle \Delta(a) | \Delta(b) \rangle & \langle \Delta(b) | \Delta(b) \rangle \end{bmatrix}$$

Where $\langle V1 | V2 \rangle$ is the dot product of the two 3D vectors V1 and V2.

The determinant of Q, denoted det(Q), is given by $$\det(Q) = \langle \Delta(a) | \Delta(a) \rangle \cdot \langle \Delta(a) | \Delta(a) \rangle - \langle \Delta(a) | \Delta(b) \rangle \cdot \langle \Delta(a) | \Delta(b) \rangle$$

If det(Q)≠0, the inverse of Q, denoted $Q^{-1}$, is given by:

$$Q^{-1} = \frac{1}{\det(Q)} \begin{bmatrix} \langle \Delta(b) | \Delta(b) \rangle & -\langle \Delta(a) | \Delta(b) \rangle \\ -\langle \Delta(a) | \Delta(b) \rangle & \langle \Delta(a) | \Delta(a) \rangle \end{bmatrix}$$

The final solution ($w_1^*$, $w_2^*$, $w_3^*$) is computed as follows:

$$w_1^* = \frac{\langle \Delta(b) | \Delta(b) \rangle \cdot \langle \Delta(a) | \Delta(d) \rangle - \langle \Delta(a) | \Delta(b) \rangle \langle \Delta(b) | \Delta(d) \rangle}{\det(Q)}$$

$$w_2^* = \frac{\langle \Delta(a) | \Delta(a) \rangle \cdot \langle \Delta(a) | \Delta(d) \rangle - \langle \Delta(a) | \Delta(b) \rangle \langle \Delta(a) | \Delta(d) \rangle}{\det(Q)}$$

$$w_3^* = 1 - w_1^* - w_2^*$$

If det(Q)=0, we degenerate to the parallelogram prediction rule:

$w_1^* = 1,$ $w_2^* = 1,$ $w_3^* = 1.$

Figure 7B:
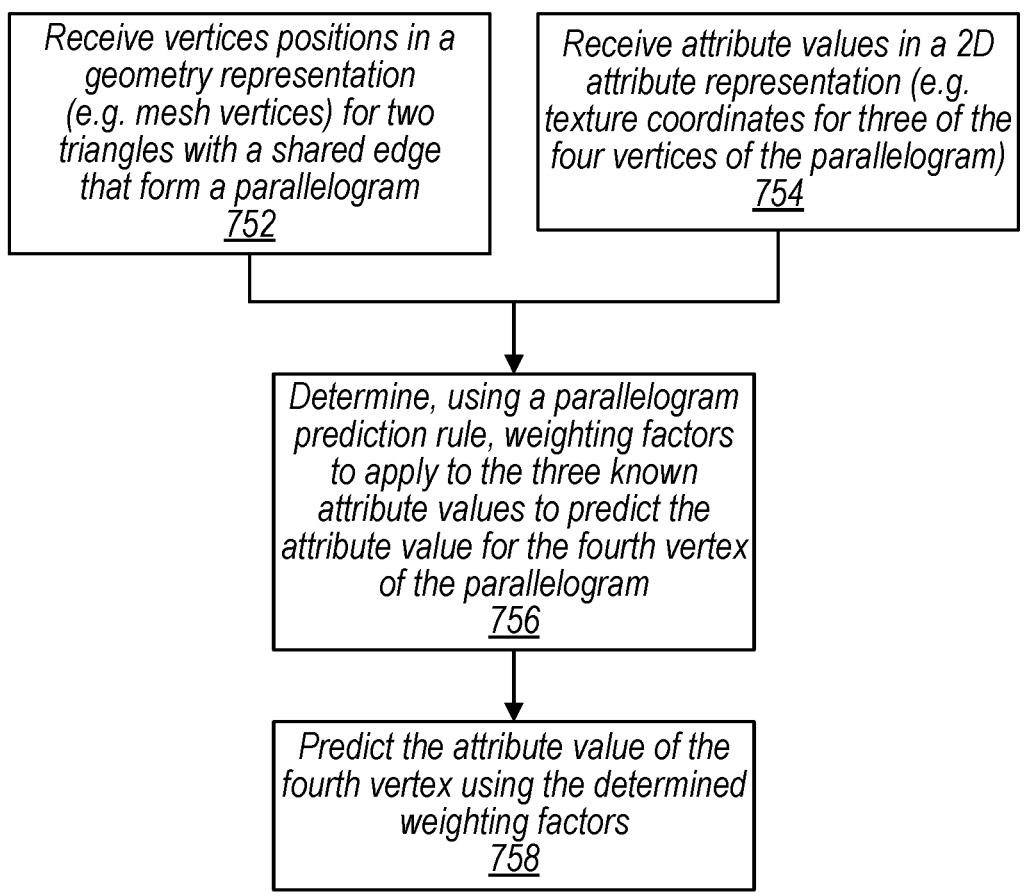
FIG. 7B illustrates an example parallelogram prediction process for predicting an attribute value of a vertex of a parallelogram when attribute values for the remaining vertices of the parallelogram have already been predicted or signaled, according to some embodiments.

FIG. 7B illustrates an example parallelogram prediction process for predicting an attribute value of a vertex of a parallelogram when attribute values for the remaining vertices of the parallelogram have already been predicted or signaled, according to some embodiments.

At block 752 vertices positions are received in a geometry representation (e.g. mesh vertices) for two triangles with a shared edge that form a parallelogram. At block 754, attribute values in a 2D attribute representation (e.g., texture coordinates for three of the four vertices of the parallelogram) are received.

At block 756 the parallelogram prediction rule as described in the above equations is used to determine weighting factors to apply to the three known attribute values to predict the attribute value for the fourth vertex of the parallelogram. At block 758, the attribute value of the fourth vertex is predicted using the determined weighting factors.

Example Adaptive Selection of Attribute Prediction Technique

Figure 8:
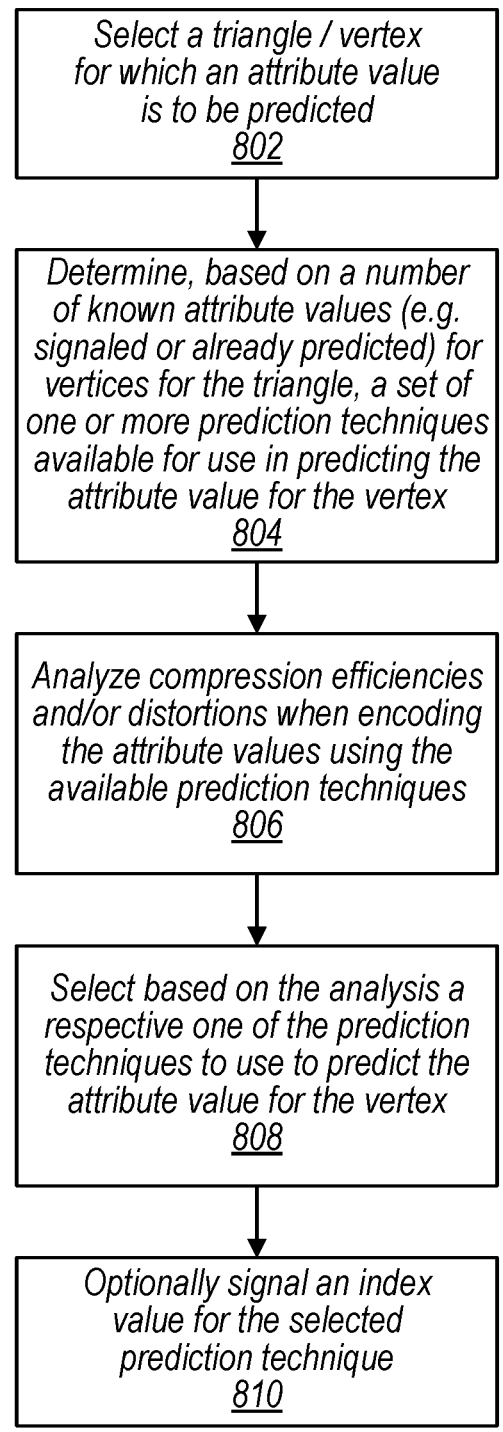
FIG. 8 illustrates an example adaptive selection process for selecting a prediction technique to use to predict an attribute value for a vertex in an attribute representation, wherein the prediction is at least partially guided by geometry information, according to some embodiments.

FIG. 8 illustrates an example adaptive selection process for selecting a prediction technique to use to predict an attribute value for a vertex in an attribute representation, wherein the prediction is at least partially guided by geometry information, according to some embodiments.

At block 802 a prediction module, such as attribute value and/or texture coordinate prediction 312 as shown in FIG. 3A or attribute value and/or texture coordinate prediction 412 as shown in FIG. 4A, selects a triangle for which an attribute value for a vertex of the triangle is to be predicted. At block 804, the prediction module determines, based on a number of known attribute values (e.g., signaled or already predicted) for vertices for the triangle, a set of one or more prediction techniques available for use in predicting the attribute value for the vertex. For example, some prediction techniques may require more known attribute values than others. As an example, orthogonal projection prediction without signaling projection direction requires more known attribute values than orthogonal projection prediction using signaled projection direction. Also, in some embodiments other prediction techniques may be used when fewer attribute value are known, such as linear prediction, average prediction, delta prediction, no prediction, etc.

At block 806, the prediction module analyzes compression efficiencies and/or distortions when encoding the attribute values using the available prediction techniques and at block 808 the prediction module selects based on the analysis a respective one of the prediction techniques to use to predict the attribute value for the vertex. For example, the prediction module may perform a rate distortion optimization (RDO) process. At block 810, the prediction module optionally signals an index value with a residual value for a predicted value indicating the prediction technique adaptively selected to perform the prediction.

Figure 9:
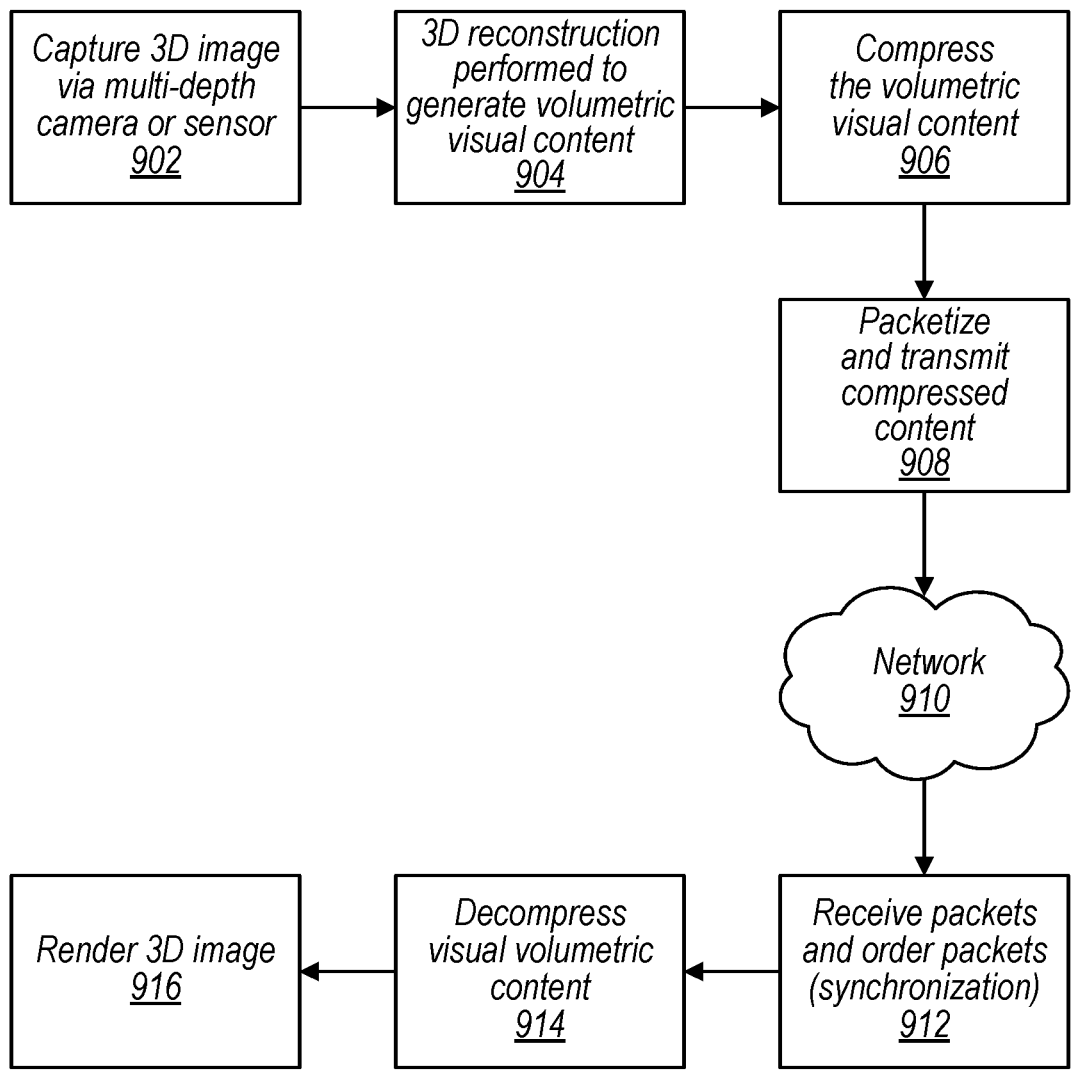
FIG. 9 illustrates compressed volumetric visual content information being used in a 3-D application, according to some embodiments.

Example Applications Using Visual Volumetric Content/ Mesh Encoders and Decoders FIG. 9 illustrates compressed volumetric visual content being used in an application representing a 3-D environment, according to some embodiments.

In some embodiments, an encoder, such as encoder 302 or any of the other encoders described herein, and a decoder, such as decoder 402 or any of the decoders described herein, may be used to communicate volumetric visual content, such as meshes in a 3-D application. For example, a sensor, at 902, may capture a 3D image and at 904, the sensor or a processor associated with the sensor may perform a 3D reconstruction based on sensed data to generate volumetric visual content, such as a mesh and associated texture.

At 906, an encoder such as encoder 302 may compress the volumetric visual content and at 908 the encoder or a post processor may packetize and transmit the compressed volumetric visual content, via a network 910. At 912, the packets may be received at a destination location that includes a decoder, such as decoder 402. The decoder may decompress the compressed volumetric visual content at 914 and the decompressed volumetric visual content may be rendered at 916. In some embodiments a 3-D application may transmit volumetric visual content in real time such that a display at 916 represents images being observed at 902. For example, a camera in a canyon may allow a remote user to experience walking through a virtual canyon at 916.

Figure 10:
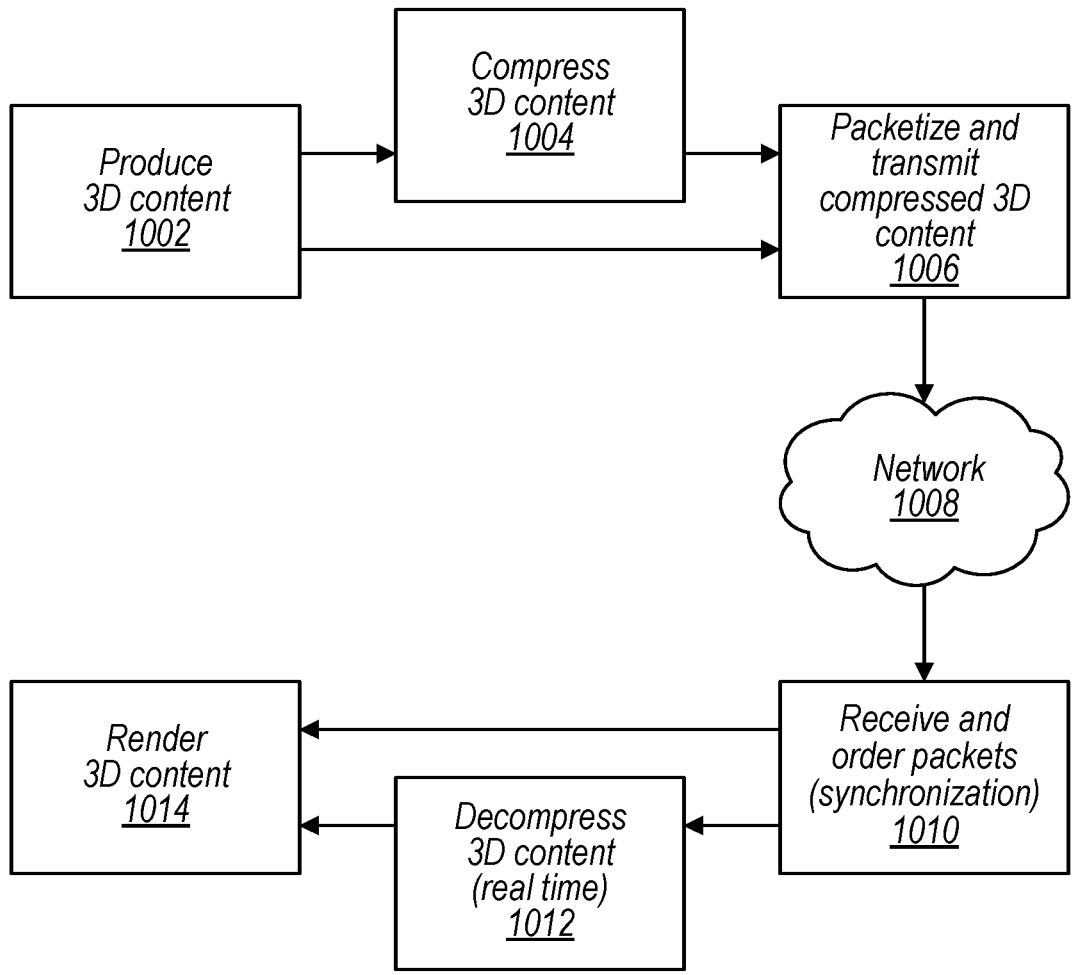
FIG. 10 illustrates compressed volumetric visual content information being used in a virtual reality application, according to some embodiments.

FIG. 10 illustrates compressed volumetric visual content, such as meshes and associated textures being used in a virtual reality (VR) or augmented reality (AR) application, according to some embodiments. In some embodiments, volumetric visual content may be generated in software (for example as opposed to being captured by a sensor). For example, at 1002 3D visual volumetric content, such as virtual reality or augmented reality content, is produced. The 3D visual volumetric content may include attribute data and/or mesh data. At 1004, the 3D volumetric visual content may be compressed and at 1006 the compressed 3D volumetric visual content data may be packetized and transmitted via a network 1008. For example, 3D visual volumetric content produced at 1002 may be produced at a remote server and communicated to a content consumer via network 1008. At 1010, the packets may be received and synchronized at the content consumer's device. A decoder operating at the content consumer's device may decompress the compressed volumetric visual content at 1012 and the decompressed visual volumetric content may be rendered in real time, for example in a head mounted display of the content consumer's device or other type of display. In some embodiments, visual volumetric content may be generated, compressed, decompressed, and rendered responsive to the consumer manipulating a device, such as the head mounted display to look in different directions.

In some embodiments, visual volumetric content compression and decompression as described herein may be used in various other applications, such as geographic information systems, sports replay broadcasting, museum displays, autonomous navigation, etc.

Example Computer System

Figure 11:
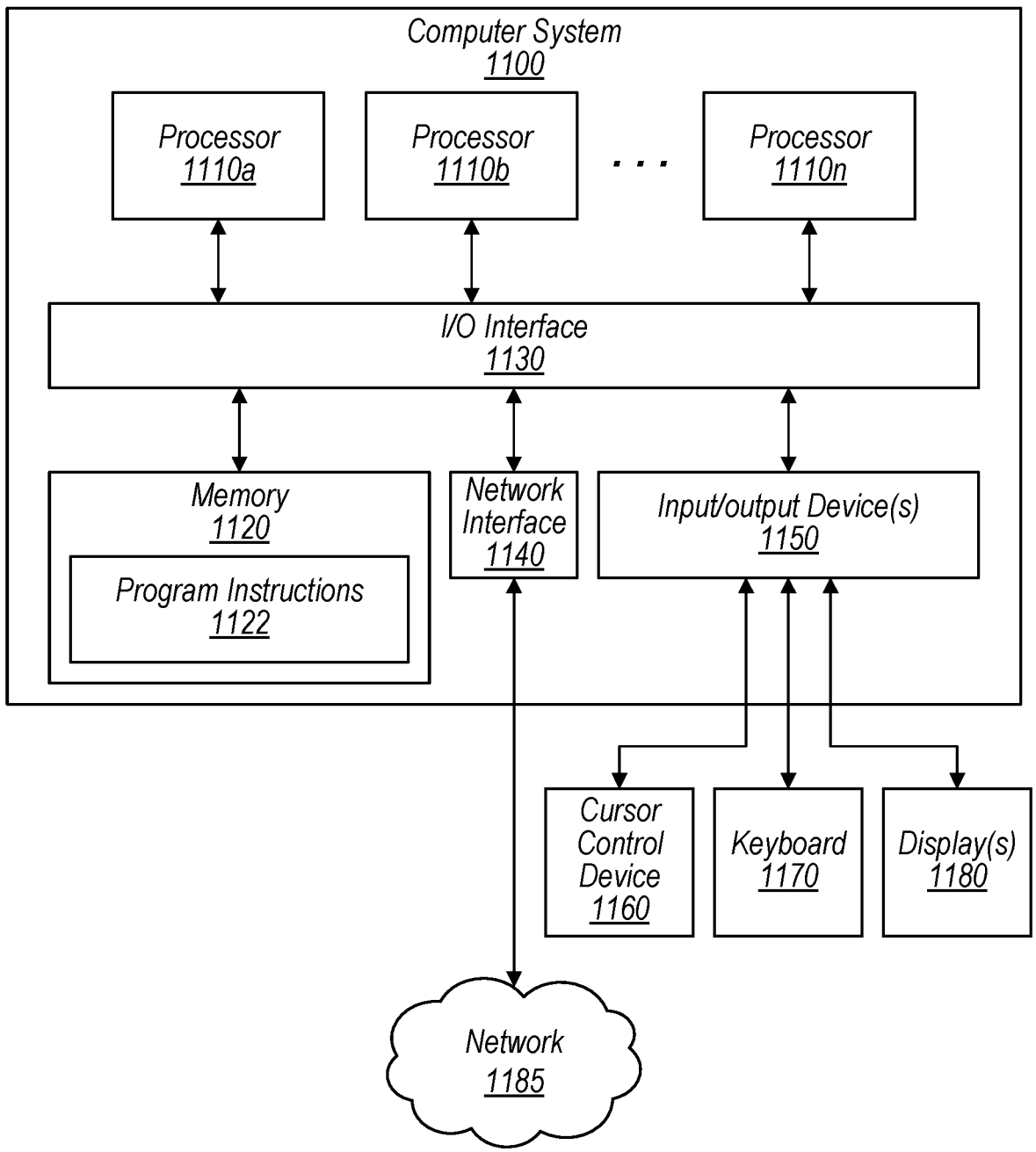
FIG. 11 illustrates an example computer system that may implement an encoder or decoder, according to some embodiments.

FIG. 11 illustrates exemplary computer system 1100 usable to implement an encoder or decoder as described above with reference to FIGS. 1-10). In different embodiments, computer system 1100 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed using one or more computer systems 1100, which may interact with various other devices. Note that any component, action, or functionality described above with respect to FIGS. 1-10 may be implemented using one or more computers such as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some embodiments, computer system 1100 may be implemented as a system on a chip (SoC). For example, in some embodiments, processors 1110, memory 1120, I/O interface 1130 (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1120 may be configured to store compression or decompression program instructions 1122 and/or sensor data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement an encoder or decoder application incorporating any of the functionality described above. In some embodiments, program instructions and/or data may be received, sent or stored upon different types of computer-accessible media or on similar media separate from system memory 1120 or computer system 1100.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included.

Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed using one or more processors, cause the one or more processors to:
   obtain, mesh geometry information for volumetric visual content, wherein the mesh geometry information comprises vertices information and connectivity information for a geometric representation of the volumetric visual content;
   obtain, attribute information for the volumetric visual content; and
   identify triangles in the geometric representation of the volumetric visual content using the mesh geometry information; and
   for respective ones of the identified triangles:
      predict an attribute value for a third vertex of a respective triangle based on:
         signaled, or previously predicted, attribute values for two other vertices of the respective triangle; and
         a geometric correlation between the respective triangle in the geometric representation and a corresponding representation of the respective triangle in the attribute information;
      determine an attribute correction value for the predicted attribute value based on comparing the predicted attribute value for the third vertex to an attribute value for the third vertex indicated in the received or generated attribute information; and
      encode the determined attribute correction values for the predicted attribute values and one or more signaled attribute values for at least one of the vertices of the identified triangles.

2. The non-transitory computer-readable medium of claim 1, wherein the geometric correlation is a conformal mapping relationship such that angles of the triangles in the geometric representation are preserved in the attribute information.

3. The non-transitory computer-readable medium of claim 2, wherein the received, or generated, attribute information comprises:
   one or more two-dimensional (2D) texture images; and
   texture coordinates for the vertices of the triangles in the geometric representation, wherein the texture coordinates indicate for respective ones of the vertices in the geometric representation corresponding pixel coordinates in the one or more 2D texture images comprising attribute values associated with the respective vertices,
   wherein the signaled attribute values or the predicted attribute values are signaled or predicted texture coordinates.

4. The non-transitory computer-readable medium of claim 3, wherein to predict the texture coordinates for the third vertex of the respective triangle the program instructions, when executed using the one or more processors, cause the one or more processors to:
   determine a first distance between a first vertex of the respective triangle and the third vertex in the geometric representation;
   determine a second distance between a second vertex of the respective triangle and the third vertex in the geometric representation;
   determine a third distance between the first vertex and the second vertex in the geometric representation;
   determine, based on the texture coordinates, a fourth distance in an attribute representation between a corresponding first vertex of the respective triangle in the attribute representation and a corresponding second vertex of the respective triangle in the attribute representation, wherein the texture coordinates of the corresponding first vertex and the corresponding second vertex in the attribute representation are the signaled, or the previously predicted, texture coordinates for the two other vertices of the respective triangle in the attribute representation for which a third vertex texture coordinate is being predicted;
   predict the texture coordinate for the third vertex in the attribute representation based on an orthogonal projection from the line corresponding to the fourth distance in the attribute representation to a predicted location of the texture coordinate for the third vertex in the attribute representation,
   wherein the orthogonal projection is based on respective ratios of sides of the respective triangle in the geometric representation, wherein preservation of angles between the respective triangle in the geometry representation and the corresponding respective triangle in the attribute representation enables a length of the orthogonal projection and a location along the line corresponding to the fourth distance in the attribute representation where the orthogonal projection is to originate from to be determined based on the ratios of the sides.

5. The non-transitory computer-readable medium of claim 4, wherein to predict the texture coordinate for the third vertex of the respective triangle the program instructions, when executed using the one or more processors, further cause the one or more processors to:
   determine using the attribute information, a sign indicating whether the orthogonal projection is to be projected out on a first side of the line corresponding to the fourth distance or projected out on a second side of the line corresponding to the fourth distance,
   wherein the determined signs indicating the direction of orthogonal projection for the respective vertices are included in a compressed version of the attribute information.

6. The non-transitory computer-readable medium of claim 5, wherein another respective triangle for which the texture coordinate for the third vertex is being predicted shares a side corresponding to the fourth distance in the attribute representation with another triangle for which a third vertex has already been predicted or signaled, wherein to predict the texture coordinate for the third vertex of the other respective triangle the program instructions, when executed using the one or more processors, further cause the one or more processors to:
determine an orthogonal projection direction on a side of the line corresponding to the fourth distance such that the orthogonal projection is on an opposite side of the line as the third vertex of the triangle that shares the side corresponding to the fourth distance and that has already been predicted or signaled,
wherein an orthogonal projection sign for the other respective triangle with the shared side is omitted from the compressed version of the attribute information.

7. The non-transitory computer-readable medium of claim 6, wherein to predict the texture coordinates for a third vertex for another respective triangle sharing a common side with a triangle for which a third vertex texture coordinate has already been predicted or signaled, the program instructions, when executed using the one or more processors, further cause the one or more processors to:
predict the texture coordinate for the third vertex of the other respective triangle using a parallelogram prediction technique.

8. The non-transitory computer-readable medium of claim 7, wherein to predict the texture coordinate for a third vertex of a given respective triangle the program instructions, when executed using the one or more processors, further cause the one or more processors to:
adaptively select a prediction procedure to use to predict the texture coordinate for the third vertex of the given respective triangle from two or more of:
orthogonal projection with signaled orthogonal projection direction sign;
orthogonal projection without signaled orthogonal projection direction sign;
the parallelogram prediction technique;
a linear prediction technique;
an average prediction technique; or
a delta prediction technique.

9. The non-transitory computer-readable medium of claim 7, wherein to adaptively select the prediction procedure the program instructions, when executed using the one or more processors, further cause the one or more processors to:
identify respective ones of the two or more prediction procedures that are available for use to predict a third vertex of a given triangle based on a required number of vertices needed to have already been predicted or signaled to use the respective prediction procedure; and
perform a rate distortion optimization analysis for the identified available prediction procedures to adaptively select the prediction procedure to use to predict the texture coordinates for the third vertex for the given triangle.

10. A non-transitory computer-readable medium storing program instructions that, when executed using one or more processors, cause the one or more processors to:
obtain mesh geometry information for volumetric visual content, wherein the mesh geometry information comprises vertices information and connectivity information for a geometric representation of the volumetric visual content;
obtain compressed attribute information for the volumetric visual content; and
identify triangles in the geometric representation of the volumetric visual content using the mesh geometry information; and
for respective ones of the identified triangles:
predict an attribute value for a third vertex of a respective triangle based on:
signaled, or previously predicted, attribute values for two other vertices of the respective triangle; and
a geometric correlation between the respective triangle in the geometric representation and a corresponding representation of the respective triangle in the attribute information; and
apply an attribute correction value included in the compressed attribute information to the predicted attribute value to generate a decompressed attribute value for the third vertex of the respective triangle.

11. The non-transitory computer-readable medium of claim 10, wherein the compressed attribute information comprises:
attribute correction values for texture coordinates for adjusting predicted texture coordinates for vertices of the triangles in the attribute representation, wherein the texture coordinates indicate for respective ones of the vertices in the geometric representation corresponding pixel coordinates in a 2D texture image that comprise texture values associated with the respective vertices in the geometric representation,
wherein the signaled attribute values or the predicted attribute values are signaled or predicted texture coordinates.

12. The non-transitory computer-readable medium of claim 11, wherein to predict the texture coordinate for the third vertex of the respective triangle, the program instructions, when executed using the one or more processors, cause the one or more processors to:
determine a first distance between a first vertex of the respective triangle and the third vertex in the geometric representation;
determine a second distance between a second vertex of the respective triangle and the third vertex in the geometric representation;
determine a third distance between the first vertex and the second vertex in the geometric representation;
determine, based on the texture coordinates, a fourth distance in an attribute representation between a corresponding first vertex of the respective triangle in the attribute representation and a corresponding second vertex of the respective triangle in the attribute representation, wherein the texture coordinates of the corresponding first vertex and the corresponding second vertex in the attribute representation are the signaled, or the previously predicted, attribute values for the two other vertices of the respective triangle for which a third vertex texture coordinate is being predicted;
predict the texture coordinate for the third vertex in the attribute representation based on an orthogonal projection from the line corresponding to the fourth distance in the attribute representation to a predicted location of the texture coordinate for the third vertex in the attribute representation,
wherein the orthogonal projection is based on respective ratios of sides of the respective triangle in the geometric representation, wherein preservation of angles between the respective triangle in the geometry representation and the corresponding respective triangle in the attribute representation enables a length of the orthogonal projection and a location along the line corresponding to the fourth to be determined, and
wherein an orthogonal projection direction is determined based on a orthogonal projection direction sign signaled in the compressed attribute information for the third vertex of the respective triangle being predicted.

13. The non-transitory computer-readable medium of claim 12, wherein to determine the orthogonal projection location and length, the program instructions, when executed using the one or more processors, cause the one or more processors to:
solve a system of equations, wherein the equations are derived from the respective ratios of the sides of the respective triangle in the geometric representation.

14. The non-transitory computer-readable medium of claim 13, wherein the system of equations are solved using fixed point numerical representations and an approximated square root function.

15. The non-transitory computer-readable medium of claim 12, wherein another respective triangle for which a texture coordinate for a third vertex is being predicted shares a side corresponding to the fourth distance in the attribute representation with another triangle for which a third vertex has already been predicted or signaled,
wherein to predict the texture coordinate for the third vertex of the other respective triangle the program instructions, when executed using the one or more processors, further cause the one or more processors to:
determine an orthogonal projection direction on a side of the line corresponding to the fourth distance such that the orthogonal projection is on an opposite side of the line as the third vertex of the triangle that shares the side corresponding to the fourth distance and that has already been predicted or signaled.

16. The non-transitory computer-readable medium of claim 10, wherein the compressed attribute information comprises signaled index values indicating adaptively selected prediction techniques to be used to predict attribute values for third vertices of the respective triangles.

17. The non-transitory computer-readable medium of claim 11, wherein to predict the texture coordinate for the third vertex of the respective triangle the program instructions, when executed using the one or more processors, cause the one or more processors to: select a prediction technique to be used to predict the texture coordinate based on: a number of already predicted or signaled texture coordinates for one or more triangles sharing a side with the respective triangle for which a texture coordinate is being predicted.

18. A method of predicting attribute values for volumetric visual content, the method comprising:
identifying triangles in a geometric representation of the volumetric visual content based on mesh geometry information; and
for respective ones of the identified triangles:
predicting an attribute value for a third vertex of a respective triangle in an attribute representation of the volumetric visual content based on:
signaled, or previously predicted, attribute values for two other vertices of the respective triangle; and
a geometric correlation between the respective triangle in the geometric representation and a corresponding representation of the respective triangle in the attribute representation.

19. The method of claim 18, wherein the geometric correlation is a conformal mapping relationship such that angles of the triangles in the geometric representation are preserved in the attribute representation.

20. The method of claim 19, wherein:
the geometric representation is a three-dimensional (3D) representation; and
the attribute representation is a two-dimensional (2D) representation of texture coordinates for vertices of the 3D representation that have been mapped to 2D using the conformal mapping relationship.

\* \* \* \* \*